United States Patent
Keller et al.

(10) Patent No.: US 6,187,703 B1
(45) Date of Patent: Feb. 13, 2001

(54) HIGH TEMPERATURE CERAMICS DERIVED FROM LINEAR CARBORANE-(SILOXANE OR SILANE)-ACETYLENE COPOLYMERS

(75) Inventors: Teddy M. Keller; David Y. Son, both of Alexandria, VA (US)

(73) Assignee: The United States of America as represented by the Secretary of the Navy, Washington, DC (US)

( * ) Notice: Under 35 U.S.C. 154(b), the term of this patent shall be extended for 634 days.

(21) Appl. No.: 08/540,148

(22) Filed: Oct. 6, 1995

(51) Int. Cl.$^7$ .................................................. C04B 35/571
(52) U.S. Cl. ........................... 501/88; 501/92; 501/96.3; 501/96.2
(58) Field of Search ............................. 501/92, 88, 96.3, 501/96.2

(56) References Cited

U.S. PATENT DOCUMENTS

| | | | |
|---|---|---|---|
| 3,234,288 | 2/1966 | D'Alello | 260/606.5 |
| 3,397,221 | 8/1968 | Papetti | 260/448.2 |
| 3,457,222 | 7/1969 | Papetti | 260/46.5 |
| 3,457,223 | 7/1969 | Papetti | 260/46.5 |
| 3,542,730 | 11/1970 | Papetti et al. | 260/448.2 |
| 3,661,847 | 5/1972 | Chapman | 260/46.5 E |
| 3,733,298 | 5/1973 | Knalaneller | 260/46.5 E |
| 4,145,504 | 3/1979 | Hedaya et al. | 528/5 |
| 4,208,492 | 6/1980 | Hedaya et al. | 525/389 |
| 4,235,987 | 11/1980 | Peters | 528/5 |
| 4,269,757 | 5/1981 | Mine et al. | 260/37 |
| 4,767,728 * | 8/1988 | Riccitiello et al. | 501/92 |
| 4,857,490 | 8/1989 | Johnson | 501/96 |
| 4,946,919 | 8/1990 | Johnson | 526/285 |
| 5,045,399 * | 9/1991 | Niebylski | 501/92 |
| 5,130,278 * | 7/1992 | Riccitiello et al. | 501/92 |
| 5,256,753 * | 10/1993 | Zank et al. | 501/92 |
| 5,272,237 | 12/1993 | Keller et al. | 528/5 |
| 5,292,779 | 3/1994 | Keller et al. | 522/99 |
| 5,348,917 | 9/1994 | Keller et al. | 501/92 |

OTHER PUBLICATIONS

Zeldin et al., "Inorganic and Organometallic Polymers", American Chemical Society, Washington, DC, (1988), pp. 44–96.

Ijadi–Maghsoodi et al., "Efficient, "One–Pot" Synthesis of Silylene–Acetylene and Disilylene–Acetylene Preceramic Polymers from Trichloroethylene", Journal of Polymer Science: Part A: vol. 28, (1990), pp. 955–965.

Wynne et al., "Ceramics via Polymer Prolysis", Annual Review Material Science, (1984), 14, pp. 297–333.

Dvornic et al., "High Temperature Siloxane Elastomers", Huthig & Wepf Verlag Basel, N.Y., (1990), pp. 277–305.

Peters, "Poly(dodecarborane–siloxanes)", J. Macromol. Sci.–Rev. Macromol. Chem., C17(2), (1979), pp. 173–209.

Papetti et al., "A New Series of Organoborances. VII. The Preparation of Poly–m–carboranylenesiloxance", Journal of Polymer Science, Part A–1, vol. 4, (1996), pp. 1623–1636.

Ijadi–Maghsoodi et al., "Synthesis and Study of Silylene–Diacetylene Polymers", Macromolecules, vol. 23, No. 20, (1990), pp. 4486–4487.

Bock et al., "d–Orbital Effects in Silicon Substituted Π–Electron Systems. Part XII. Some Spectroscopic Properties of Alkyl and Silyl Acetylenes and Polyacetylenes", J. Chem. Soc. (B), (1968), pp. 1158–1163.

Eastmond et al., "Silylation as a Protective Method for Terminal Alkynes in Oxidative Couplings —A General Synthesis of the Parent Polyynes", 28 Tetrahedron (1972), pp. 4601–4616.

Papetti et al., "A New Series of Organoboranes. VI. The Synthesis and Reactions of Some Silyl Neocarboranes", Inorganic Chemistry, vol. 3, No. 10, Oct. 1964, pp. 1448–1450.

Scott et al., "Icosahedral Carboranes. XV Monomeric Carboranylenesiloxanes", Inorganic Chemistry, vol. 9, No. 11, (1970), pp. 2597–2600.

Callstrom et al., "Poly(ethynylene(3Π–butyl–2, 5–thiophenediyl)–ethynylene): A Soluble Polymer Containing Diacetylene Units and Its Conversion to a Highly Cross–Linked Organic Solid", Macromolecules, vol. 21, No. 12, (1988), pp. 3528–3530.

Neenan et al., "Hypercross–Linked Organic Solids: Preparation from Poly(aromatic diacetylenes) and Preliminary Measurements of Their Young's Modulus, Hardness and Thermal Stability", Macromolecules, vol. 21, (1988), pp. 3525–3528.

\* cited by examiner

*Primary Examiner*—Karl Group
(74) *Attorney, Agent, or Firm*—Barry A. Edelberg; John J. Karasek

(57) ABSTRACT

This invention relates to a new class of novel inorganic-organic hybrid ceramics that are formed from novel linear polymers of varying molecular weight and varying carborane content.

20 Claims, 16 Drawing Sheets

HIGH TEMPERATURE CERAMICS DERIVED FROM LINEAR CARBORANE-(SILOXANE OR SILANE)-ACETYLENE COPOLYMERS

BACKGROUND OF THE INVENTION

1. Field of the Invention

This invention relates to a new class of novel inorganic-organic hybrid polymers that are formed from linear inorganic-organic hybrid polymers of varying molecular weight. These new high temperature oxidatively stable thermosetting polymers are formed from linear polymeric materials having repeat units that contain at least one alkynyl group for cross-linking purposes and at least one bis(silyl or siloxanyl)carboranyl group and wherein the carborane content of the thermosets can be varied. These novel thermosetting polymers can be further converted into ceramics at elevated temperatures.

2. Description of the Related Art

The cross linking of acetylenic polymers has been demonstrated by Neenan et al. in Hypercross-Linked Organic Solids: Preparation from Poly(aromatic diacetylenes) and Preliminary Measurements of Their Young's Modulus, Hardness, and Thermal Stability published in 21 MACROMOLECULES 3525–28 (1988), incorporated herein by reference. Other similar cross linking reactions are demonstrated by Callstrom et al. in Poly[ethynlyene(3-n-butyl-2,5-thiophenediyl)-ethynylene]: A Soluble Polymer Containing Diacetylene Units and Its Conversion to a Highly Cross-Linked Organic Solid published in 21 MACROMOLOCULES 3528–30 (1988), incorporated herein by reference. The recent literature reflects continuing major research efforts to advance fundamental knowledge in high temperature material design. See K J. Wynne and R. W. Rice, Ceramics Via Polymer Pyrolysis 14 ANN. REV. MAT. SCI. 297 (1984) incorporated herein by reference in its entirety and for all purposes. In the search for high temperature oxidatively stable materials considerable attention has been given to polymers containing boron within the polymer. It has been known that the addition of a carborane within a siloxane polymer significantly increases the thermal stability of such siloxane polymers.

The thermal properties of various siloxane polymers are given by PETAR DVORNIC ET AL. in HIGH TEMPERATURE SILOXANE ELASTOMERS published by Huthig & Wepf Verlag Basel, New York (1990) on pp. 277 in FIG. 5.7 and on pp.282 in FIG. 5.12 and by Edward N. Peters in Poly(dodecacarborane-siloxanes) published in J. MACROMOL SCI.-REV. MACROMOL. CHEM., C17(2) on pp. 190–199 in FIGS. 3,4,5,6,7,10 and 12, each reference being incorporated herein by reference in its entirety and for all purposes. See also Maghsoodi et al. in Synthesis and Study of Silylene-Diacetylene Polymers published in 23 MACROMOLECULES pp. 4486 (1990), incorporated herein by reference in its entirety and for all purposes.

Many of the carborane polymers manufactured are cited in various U.S. patents. See, for instance, the following U.S. Pat. Nos.: 5,348,917; 5,292,779; 5,272,237; 4,946,919; 4,269,757; 4,235,987; 4,208,492; 4,145,504; 3,661,847; 3,542,730; 3,457,222; and 3,234,288, each patent being incorporated herein by reference in its entirety and for all purposes.

There is a need for oxidatively stable ceramic materials suitable for making rigid components therefrom (e.g. by combining with fiberglass or carbon matrix or other matrix fibers, respectively), such as engine parts, turbine blades and matrices. These components must withstand high temperatures and be oxidatively stable and have sufficient strength to withstand the stress put on such components.

There is a need for carborane-silane and/or carborane-siloxane ceramic materials wherein the carborane content of the ceramics can be varied by varying the carborane content of the precursor thermosetting polymers. Weight percentage loss of the ceramic materials is limited to 50% or less from the original total weight or where the weight percentage loss is limited to 40% or less after formation of the precursor thermoset when heated in excess of 400 to 700° C. in an oxidative environment.

There is a need for carborane-silane and/or carborane-siloxane ceramic materials wherein the carborane content of the ceramics can be varied by varying the carborane content of the precursor thermosetting polymers. Weight percentage loss of the ceramic materials is limited to 30% or less from the original total weight or where the weight percentage loss is limited to 15% or less after formation of the precursor thermoset when heated in excess of 400 to 700° C. in an oxidative environment.

There is a need for carborane-silane and/or carborane-siloxane ceramic materials wherein the carborane content of the ceramics can be varied by varying the carborane content of the precursor thermosetting polymers. Weight percentage loss of the ceramic materials is limited to 20% or less from the original total weight or where the weight percentage loss is limited to 10% or less after formation of the precursor thermoset when heated in excess of 400 to 700° C. in an oxidative environment.

In addition, there is a need for carborane-silane and/or carborane-siloxane ceramic materials that behave more as rigid materials and less as elastomeric materials and wherein the carborane content of the ceramics can be varied.

There is a further need to provide carborane-silane and/or carborane-siloxane ceramic materials wherein the carborane content within the ceramics can be varied to provide maximum thermal stability and minimum cost.

In addition, a majority of the carborane-siloxane and/or carborane-silane polymers made by others show elastomeric properties rather than properties of more rigid products like ceramics. Thus, in addition to thermal stability, there is also a need for materials that behave more as ceramics, upon further polymerization, and less like elastomeric polymers.

SUMMARY OF THE INVENTION

It is therefore an object of the present invention to provide carborane-silane-alkenyl and/or carborane-siloxane-alkenyl containing ceramic materials that show high temperature stability where weight percentage loss is limited to 50% or less from the original total weight or where the weight percentage loss is limited to 40% or less after formation of the precursor thermoset when heated in excess of 400 to 700° C. in an oxidative environment and wherein the content of carborane within the ceramic (and the precursor thermoset) can be varied.

It is therefore an object of the present invention to provide carborane-silane-alkenyl and/or carborane-siloxane-alkenyl containing ceramic materials that show high temperature stability where weight percentage loss is limited to 30% or less from the original total weight or where the weight percentage loss is limited to 15% or less after formation of the precursor thermoset when heated in excess of 400 to 700° C. in an oxidative environment and wherein the content of carborane within the ceramic (and the precursor thermoset) can be varied.

It is therefore an object of the present invention to provide carborane-silane-alkenyl and/or carborane-siloxane-alkenyl containing ceramic materials that show high temperature stability where weight percentage loss is limited to 20% or less from the original total weight or where the weight percentage loss is limited to 10% or less after formation of the precursor thermoset when heated in excess of 400 to 700° C. in an oxidative environment and wherein the content of carborane within the ceramic (and the precursor thermoset) can be varied.

It is therefore yet another object of the present invention to provide carborane-silane-alkenyl and/or carborane-siloxane-alkenyl containing ceramic materials wherein the carborane content within the ceramic materials can be varied to provide maximum thermal stability and minimum cost.

These and other objects are accomplished by forming linear polymers having the composition:

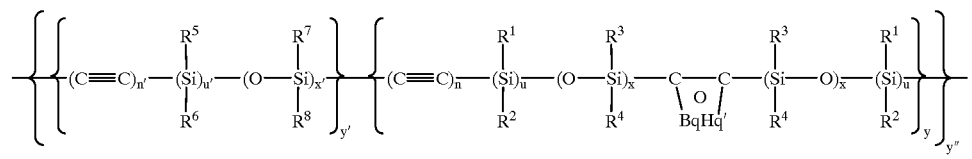

wherein n, n', u, u', x, x', y, y' and y" are integers, wherein the ratio y'/y≠0, wherein A is selected from the group consisting of O, an aliphatic bridge, an aryl bridge or mixtures thereof and E is selected from the group consisting of O, an aliphatic bridge, an aryl bridge or mixtures thereof. In addition, E and/or A may further be selected from the group consisting of an aliphatic bridge of about 1 to about 20 carbon atoms, an aryl bridge of about 5 to 40 carbon atoms, or mixtures thereof. Furthermore, A and E may be the same or different. Further heating or light exposure forms the desired thermosets. Further heating of the thermosets forms the desired ceramics.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein:

FIGS. 1, 2, and 3 are for the polymer having the formula:

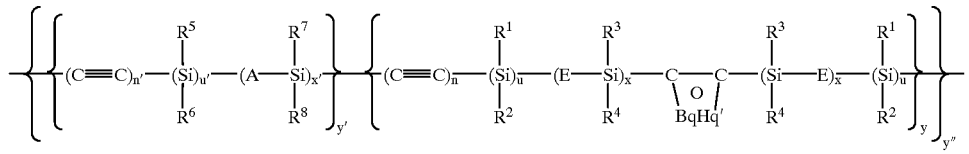

where n'=n=2, q=q'=10, u=u'=x=x'=1, $R^1=R^2=R^3=R^4=R^5=R^{6y''}=R^7=R^8=CH_3$ and the ratio y'/y on average is equal to about 1.0.

Figure 4:
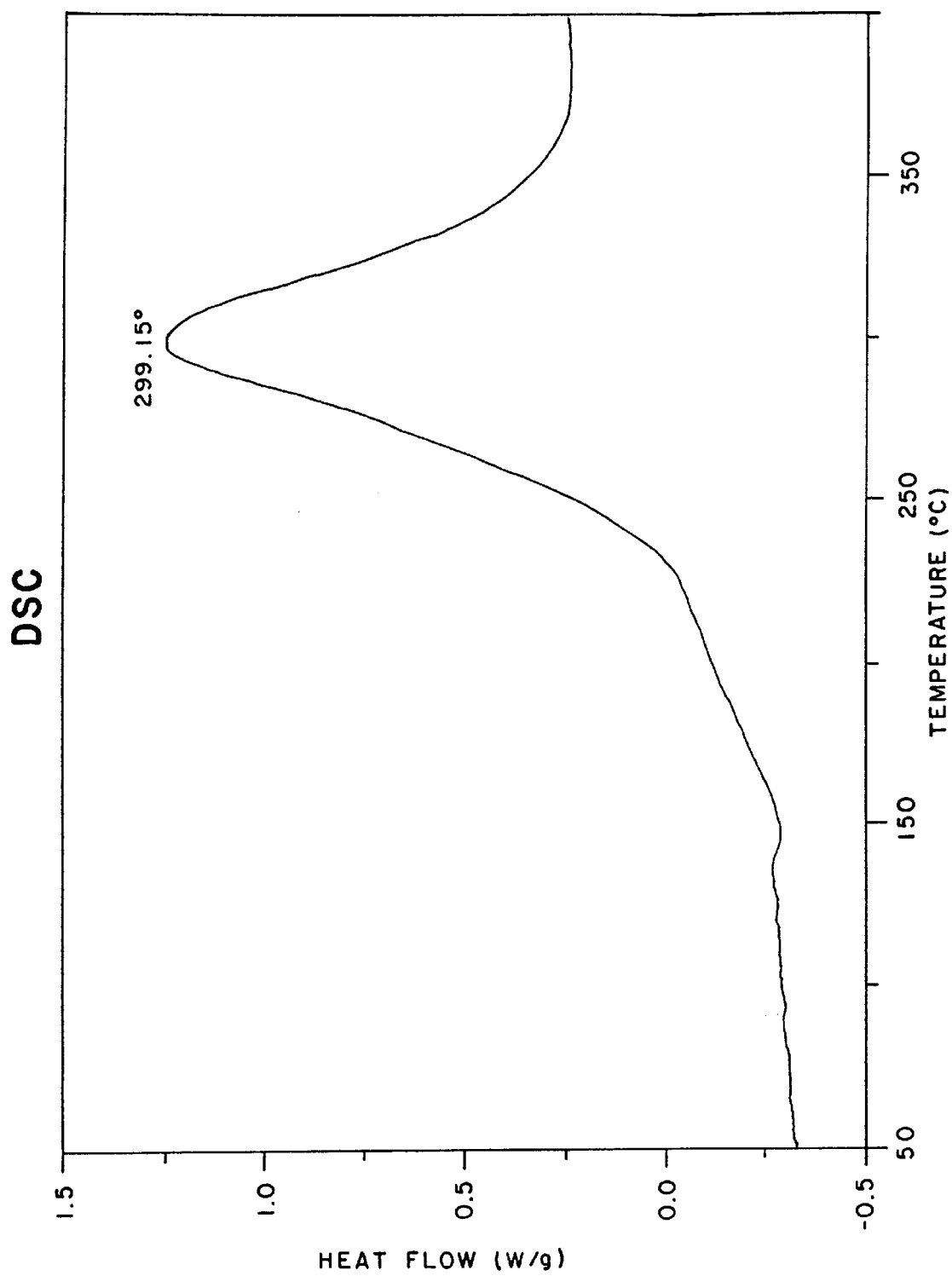

FIG. 4 is a differential scanning calorimetry (DSC) plot of heat flow versus temperature in nitrogen obtained at an exemplary heating rate of 10° C./minute.

Figure 5:
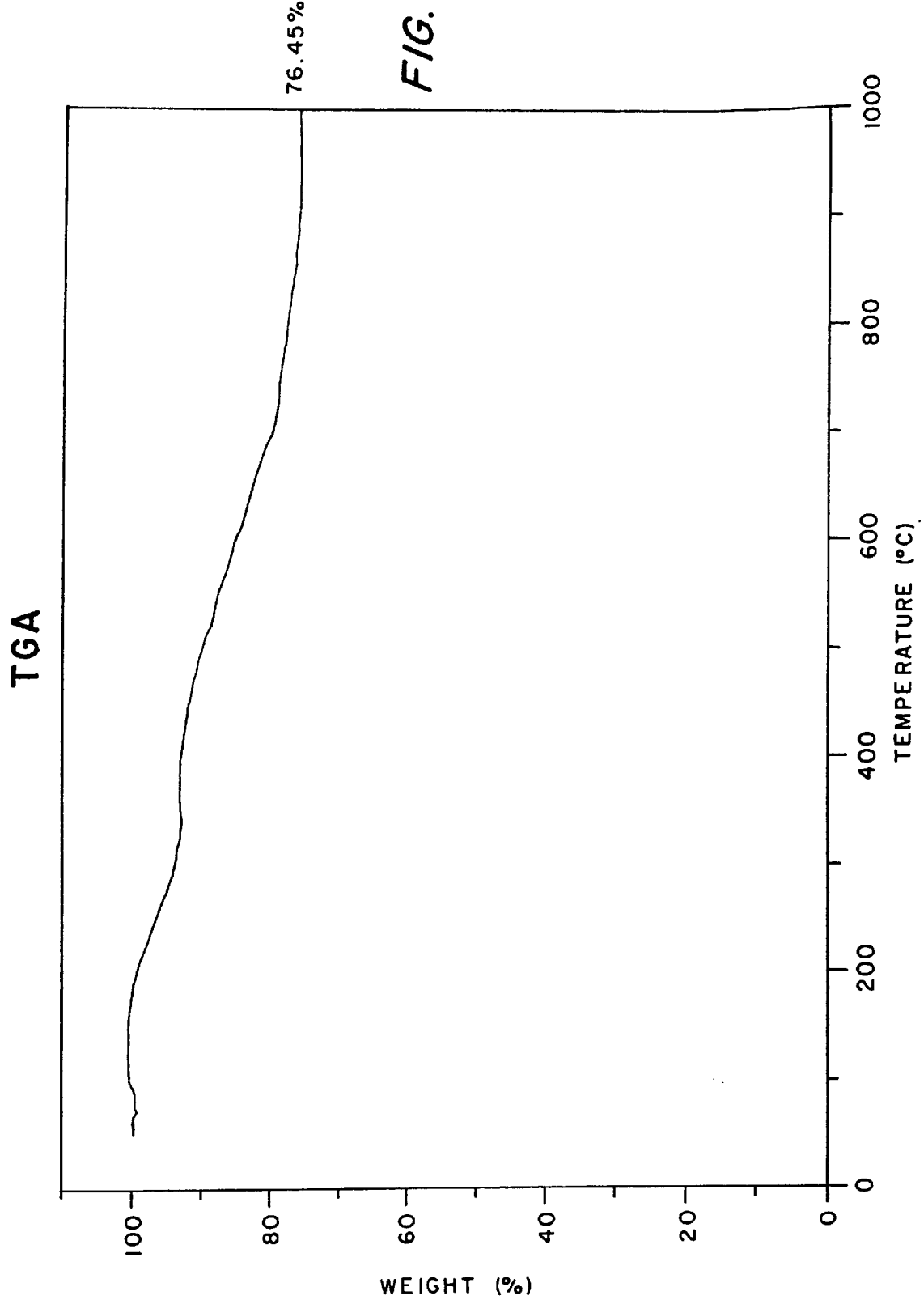

FIG. 5 is a thermogravimetric analytical (TGA) plot of weight % versus temperature in nitrogen obtained on the first heating cycle (e.g. heating from 50° C. to 1000° C. at 10° C./minute).

Figure 6:
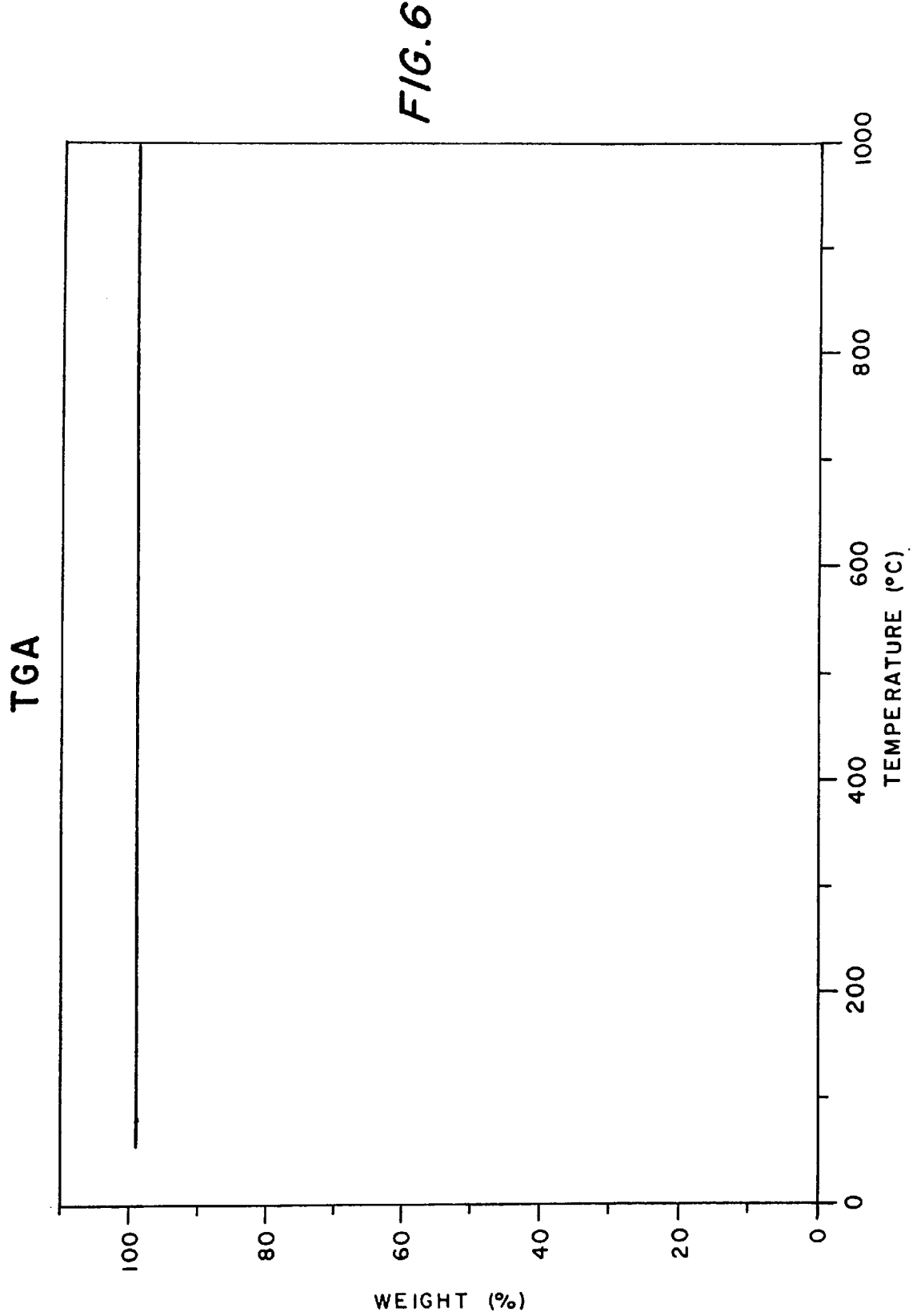

FIG. 6 is a TGA plot of weight versus temperature in an oxidizing environment (air), subsequently obtained on the second heating cycle (e.g. heating from 100° C. to 1000° C. at 10° C./minute).

FIGS. 4, 5, and 6 are for the polymer having the formula:

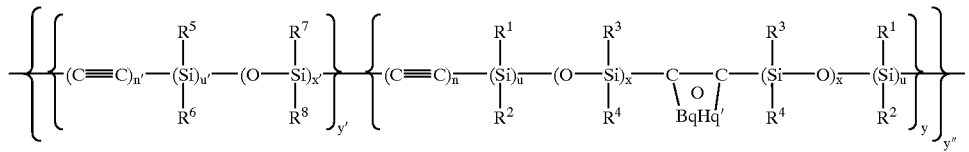

where n'=n=2, q=q'=10, u=u'=x=x'=1, $R^1=R^2=R^3=R^4=R^5=R^6=R^7=R^8=CH_3$ and the ratio y'/y on average is equal to about 3.0.

Figure 7:
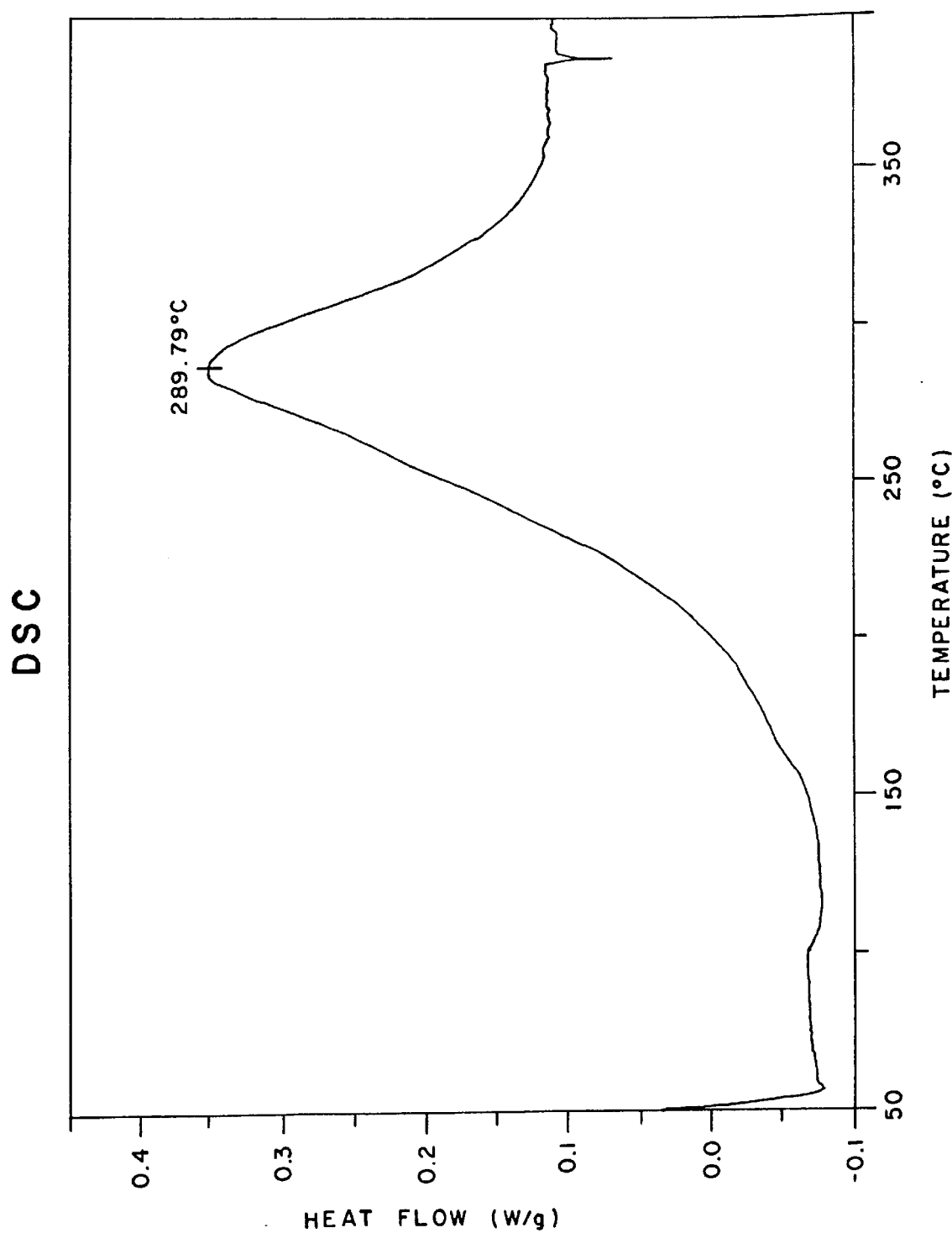

FIG. 7 is a differential scanning calorimetry (DSC) plot of heat flow versus temperature in nitrogen obtained at an exemplary heating rate of 10° C./minute.

Figure 8:
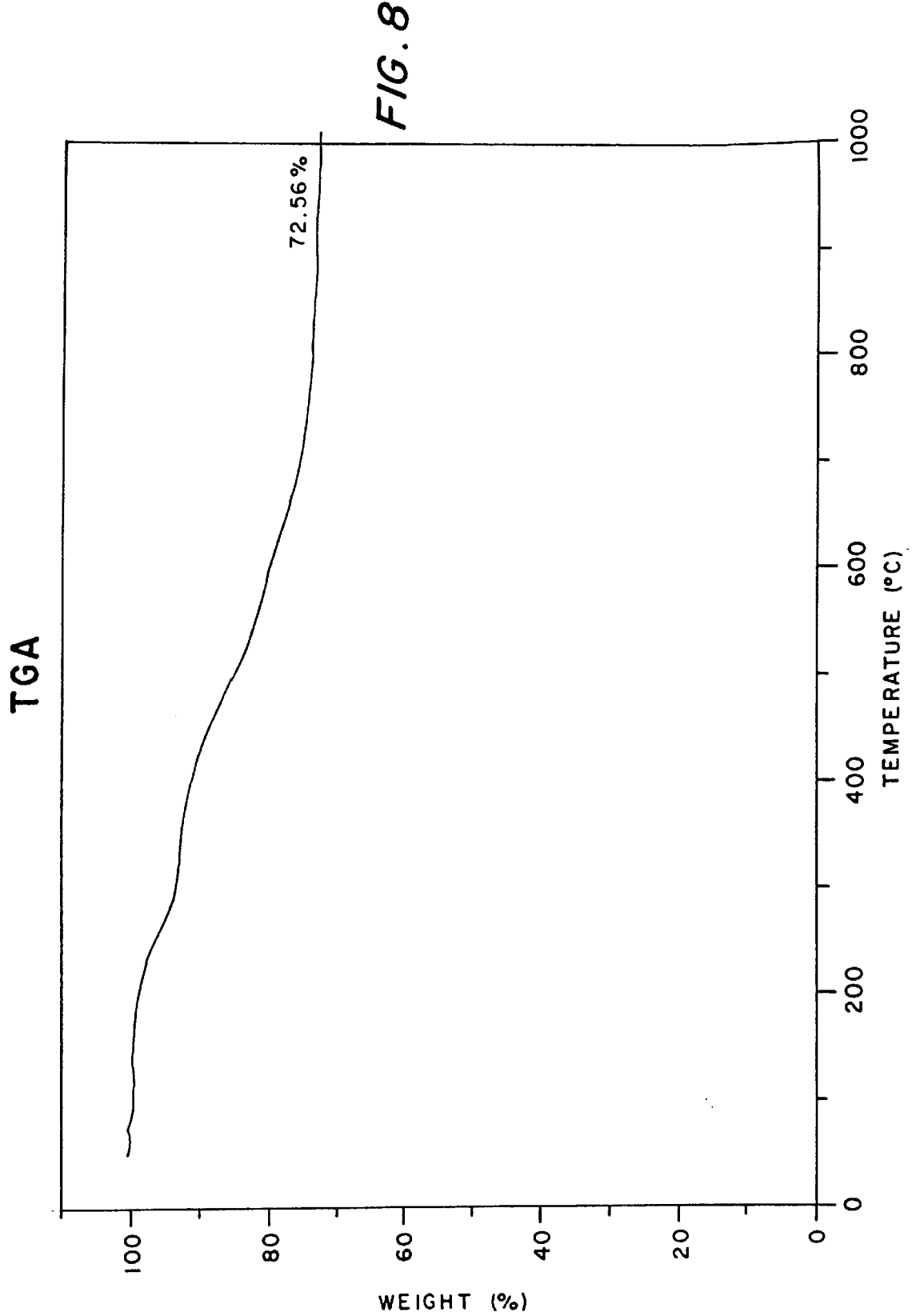

FIG. 8 is a thermogravimetric analytical (TGA) plot of weight % versus temperature in nitrogen obtained on the first heating cycle (e.g. heating from 50° C. to 1000° C. at 10° C./minute).

Figure 9:
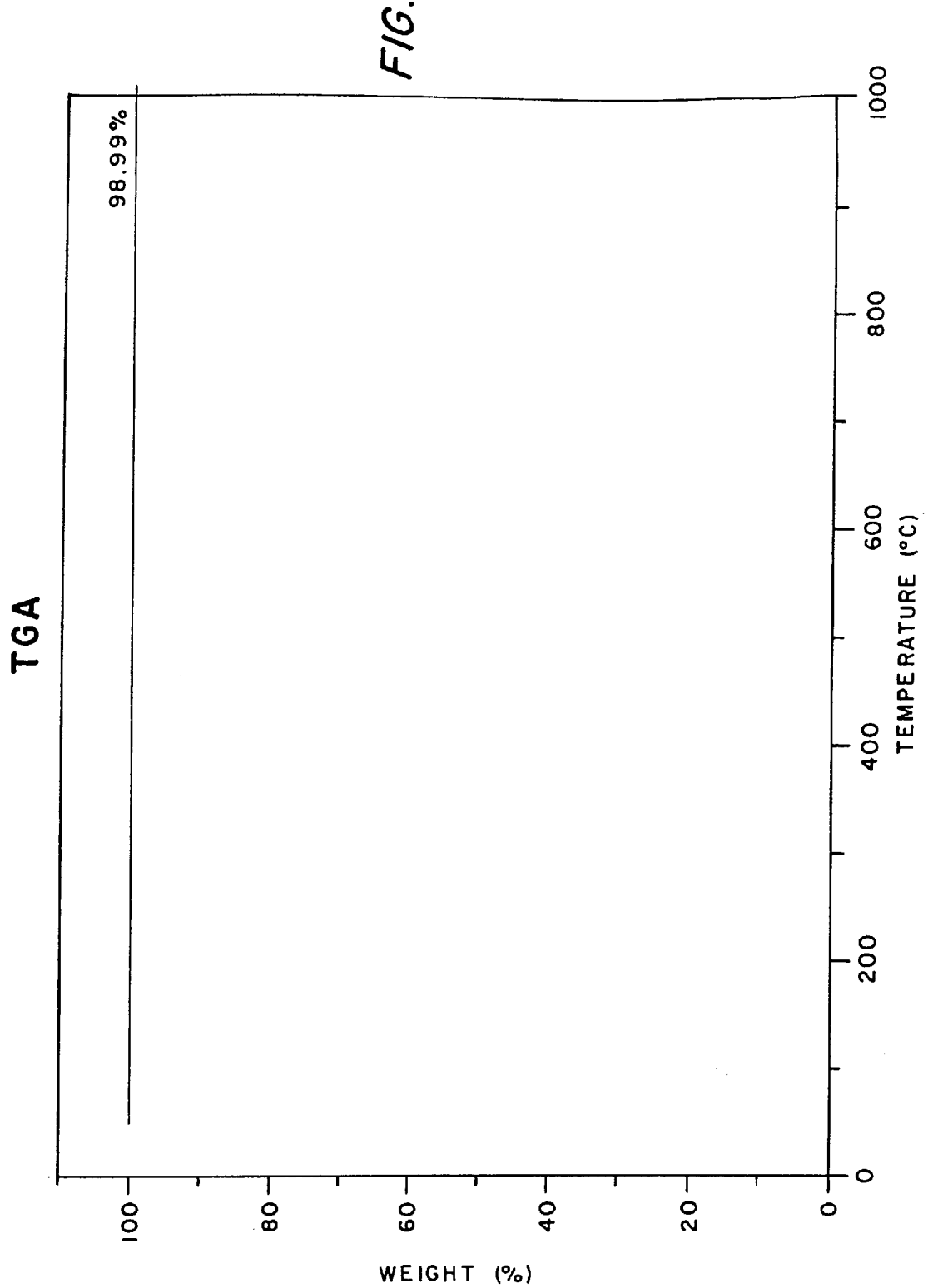

FIG. 9 is a TGA plot of weight versus temperature in an oxidizing environment (air), subsequently obtained on the second heating cycle (e.g. heating from 100° C. to 1000° C. at 10° C./minute).

FIGS. 7, 8, and 9 are for the polymer having the formula:

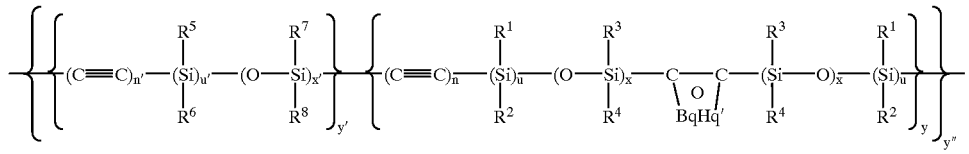

where n'=n=2, q=q'=10, u=u'=x=x'=1, $R^1=R^2=R^3=R^4=R^5=R^6=R^7=R^8=CH_3$ and the ratio y'/y on average is equal to about 9.0.

Figure 10:
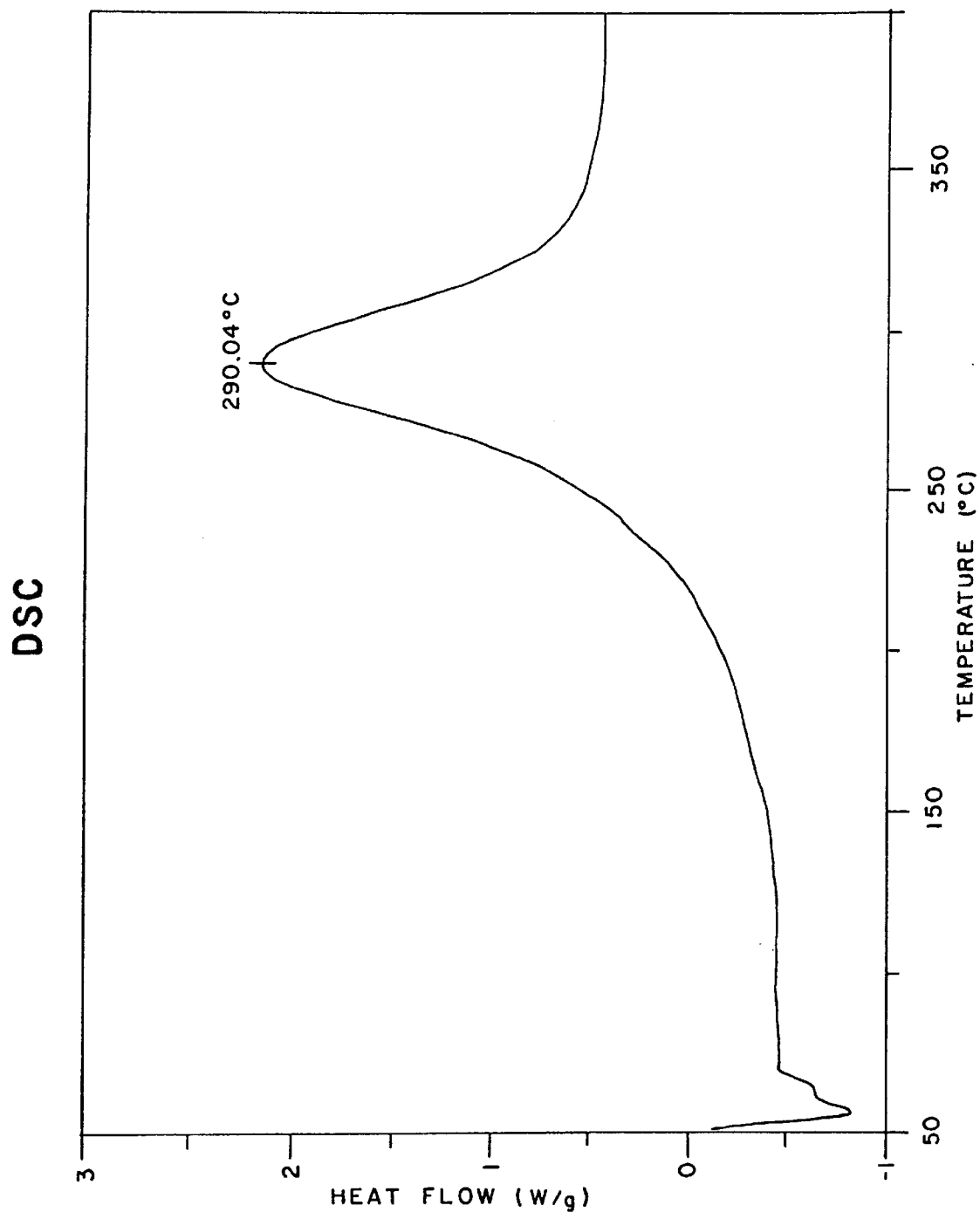

FIG. 10 is a differential scanning calorimetry (DSC) plot of heat flow versus temperature in nitrogen obtained at an exemplary heating rate of 10° C./minute.

Figure 11:
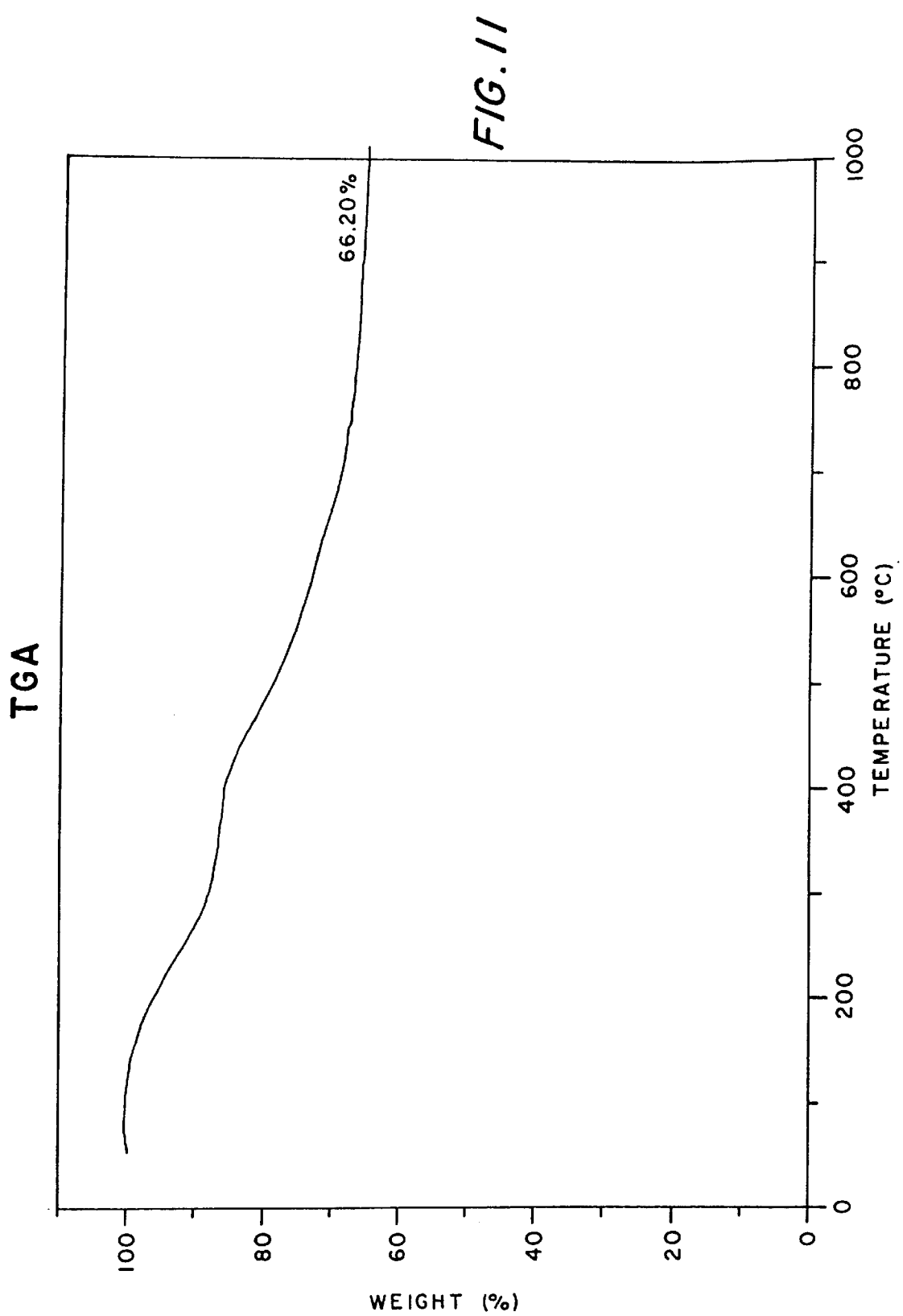

FIG. 11 is a thermogravimetric analytical (TGA) plot of weight % versus temperature in nitrogen obtained on the first heating cycle (e.g. heating from 50° C. to 1000° C. at 10° C./minute).

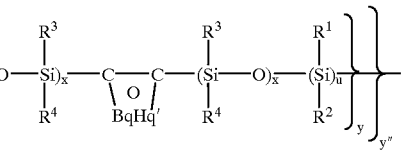

Figure 12:
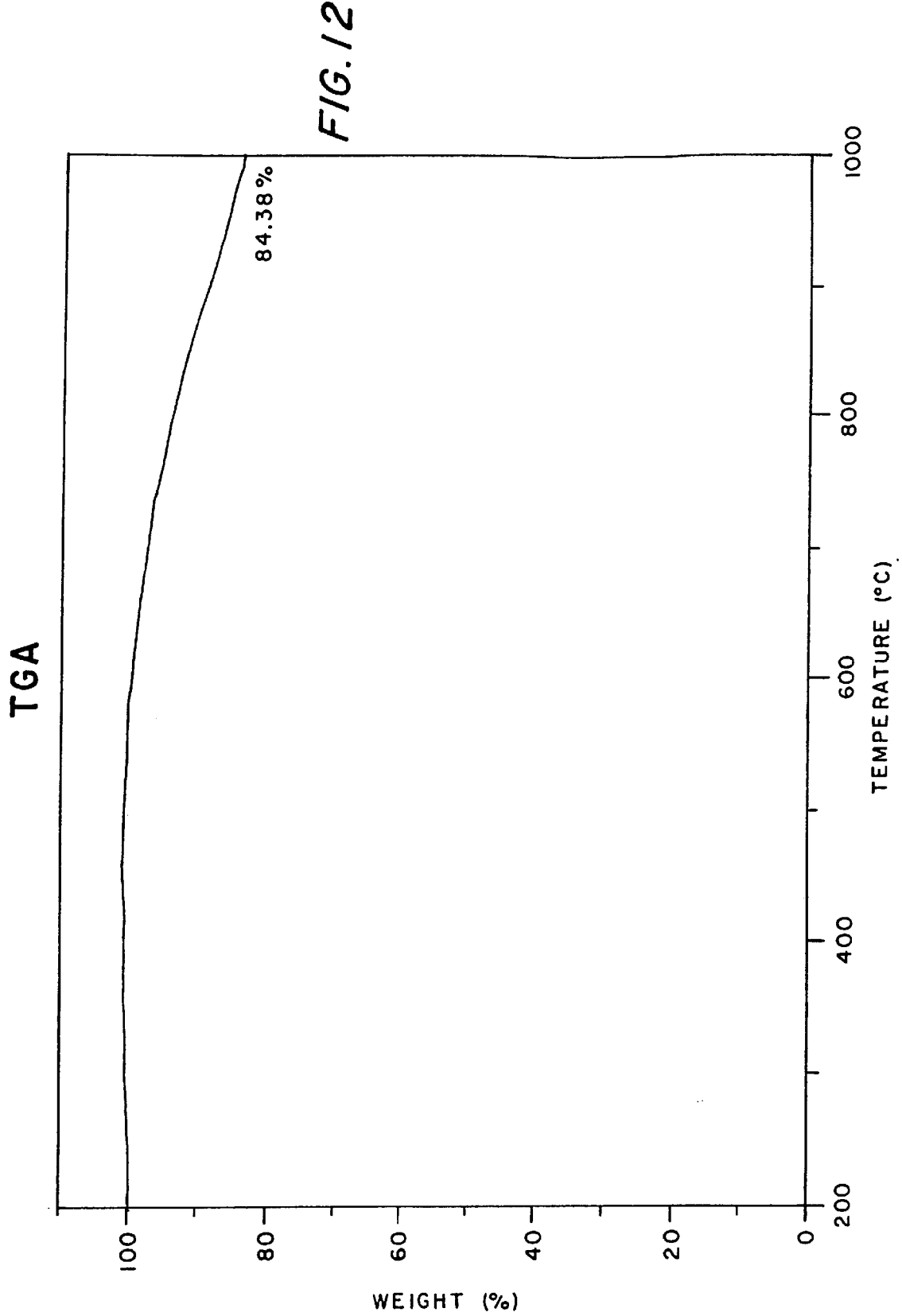

FIG. 12 is a TGA plot of weight versus temperature in an oxidizing environment (air), subsequently obtained on the second heating cycle (e.g. heating from 100° C. to 1000° C. at 10° C./minute).

FIGS. 10, 11, and 12 are for the polymer having the formula:

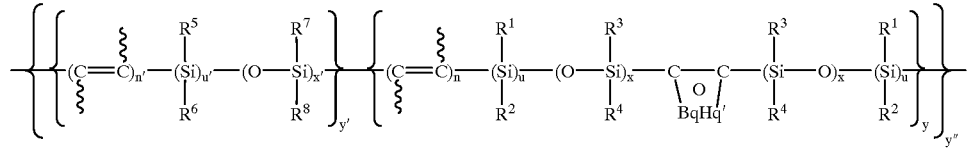

where n'=n=2, q=q'=10, u=u'=x=x'=1, $R^1=R^2=R^3=R^4=R^5=R^6=R^7=R^8=CH_3$ and the ratio y'/y on average is equal to about 19.0.

Figure 1:
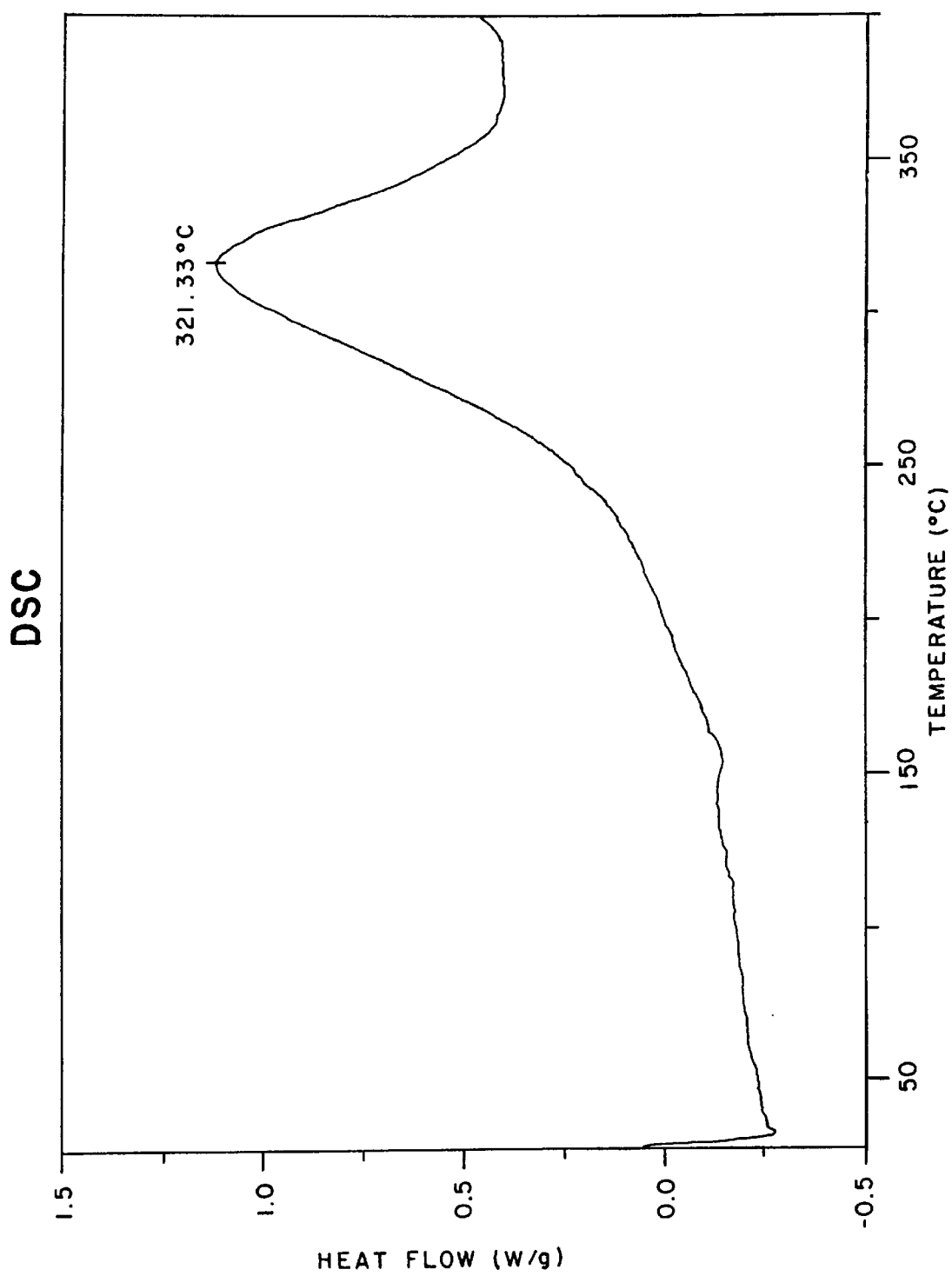
FIG. 1 is a differential scanning calorimetry (DSC) plot of heat flow versus temperature in nitrogen obtained at an exemplary heating rate of 10° C./minute.
Figure 2:
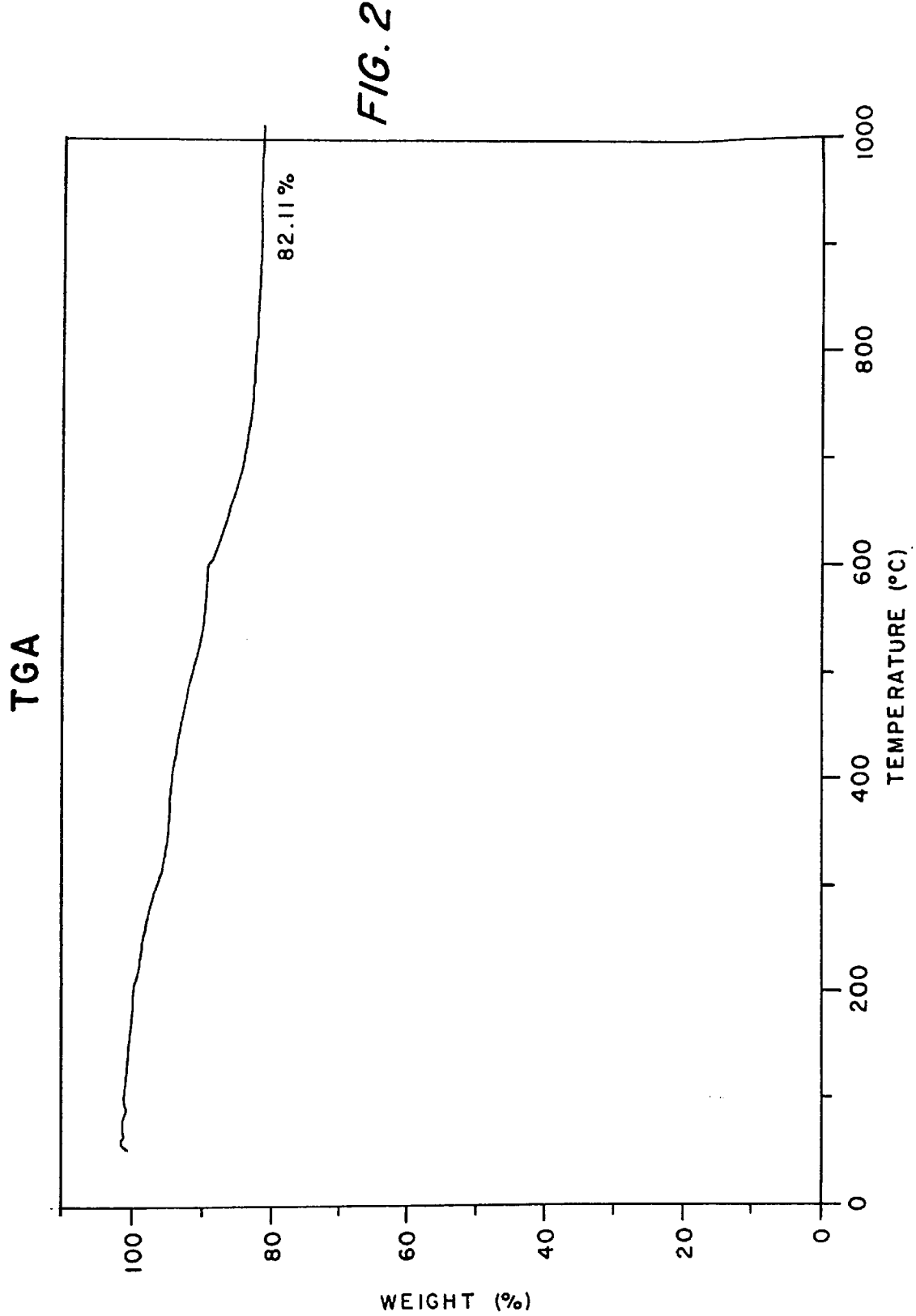
FIG. 2 is a thermogravimetric analytical (TGA) plot of weight % versus temperature in nitrogen obtained on the first heating cycle (e.g. heating from 50° C. to 1000° C. at 10° C./minute).
Figure 3:
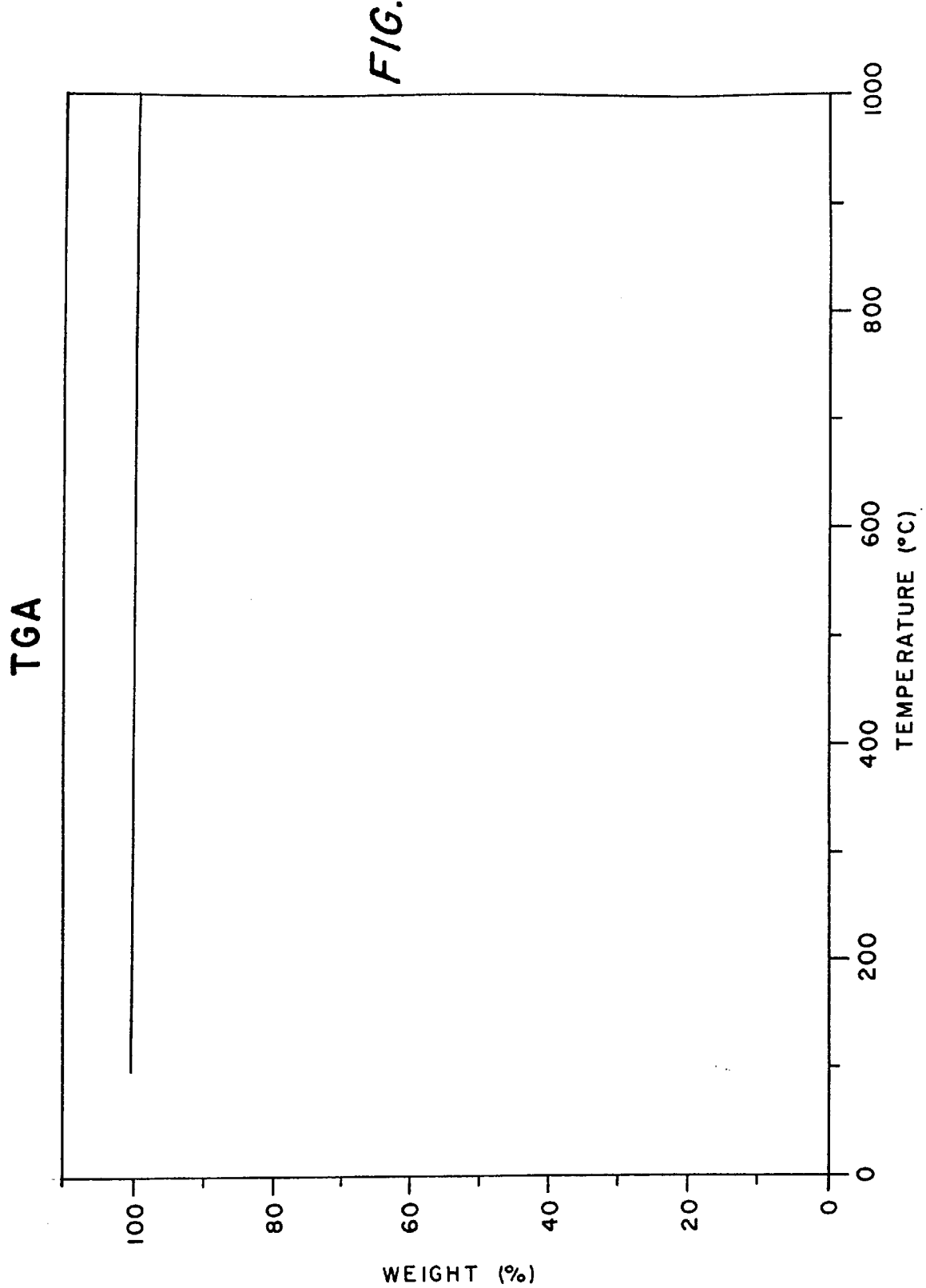
FIG. 3 is a TGA plot of weight versus temperature in an oxidizing environment (air), subsequently obtained on the second heating cycle (e.g. heating from 100° C. to 1000° C. at 10° C./minute).
Figure 13:
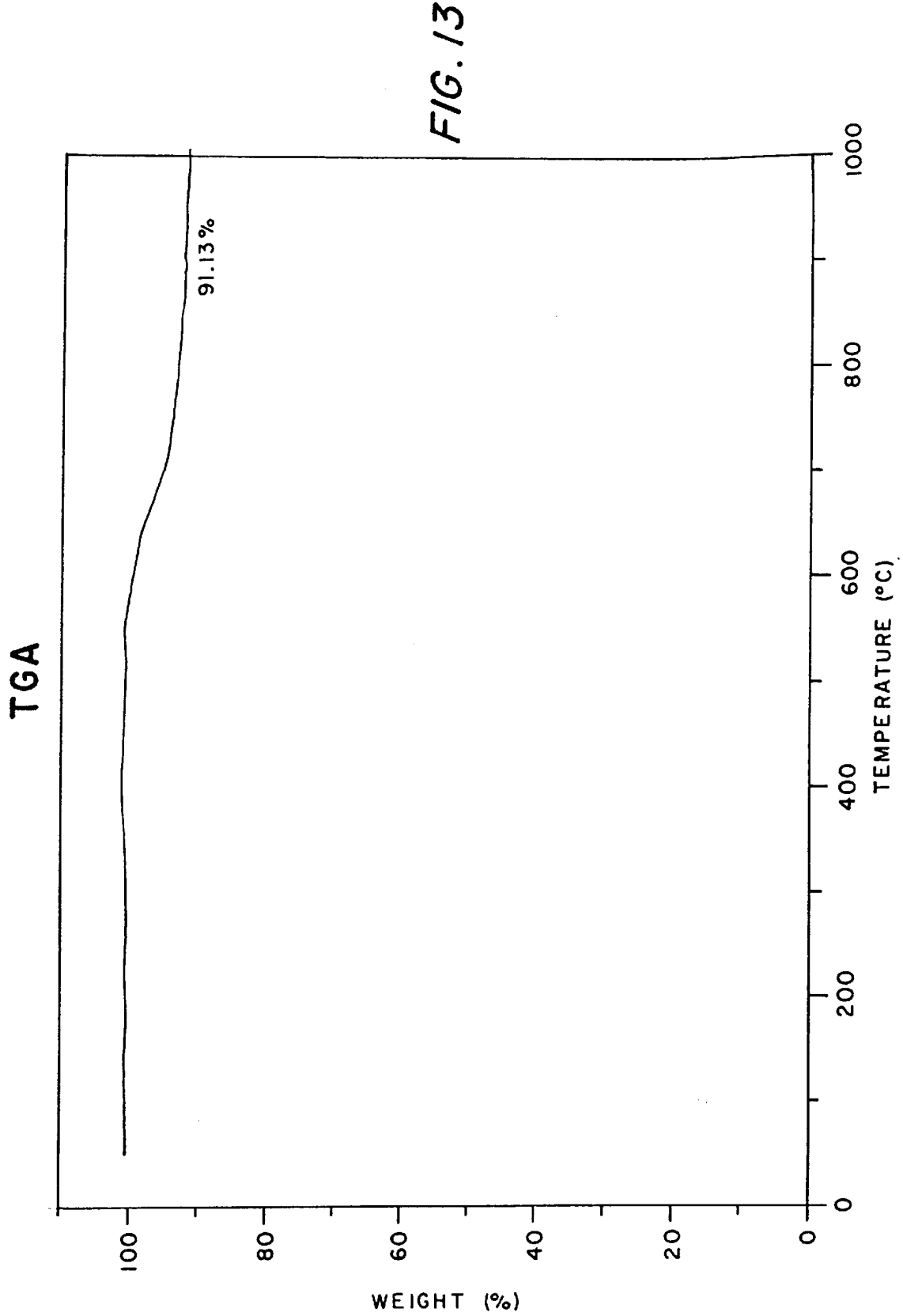
Figure 14:
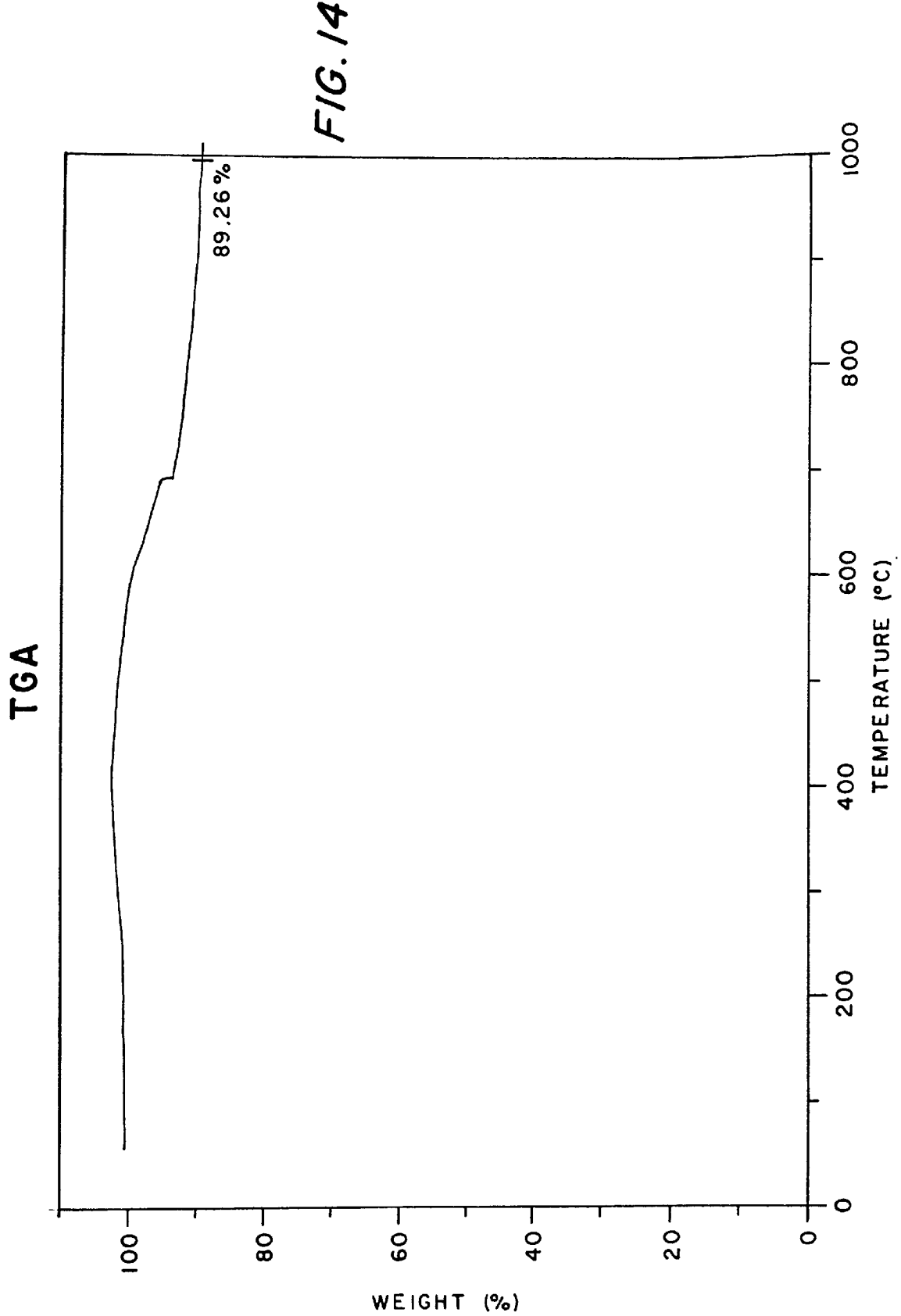
Figure 15:
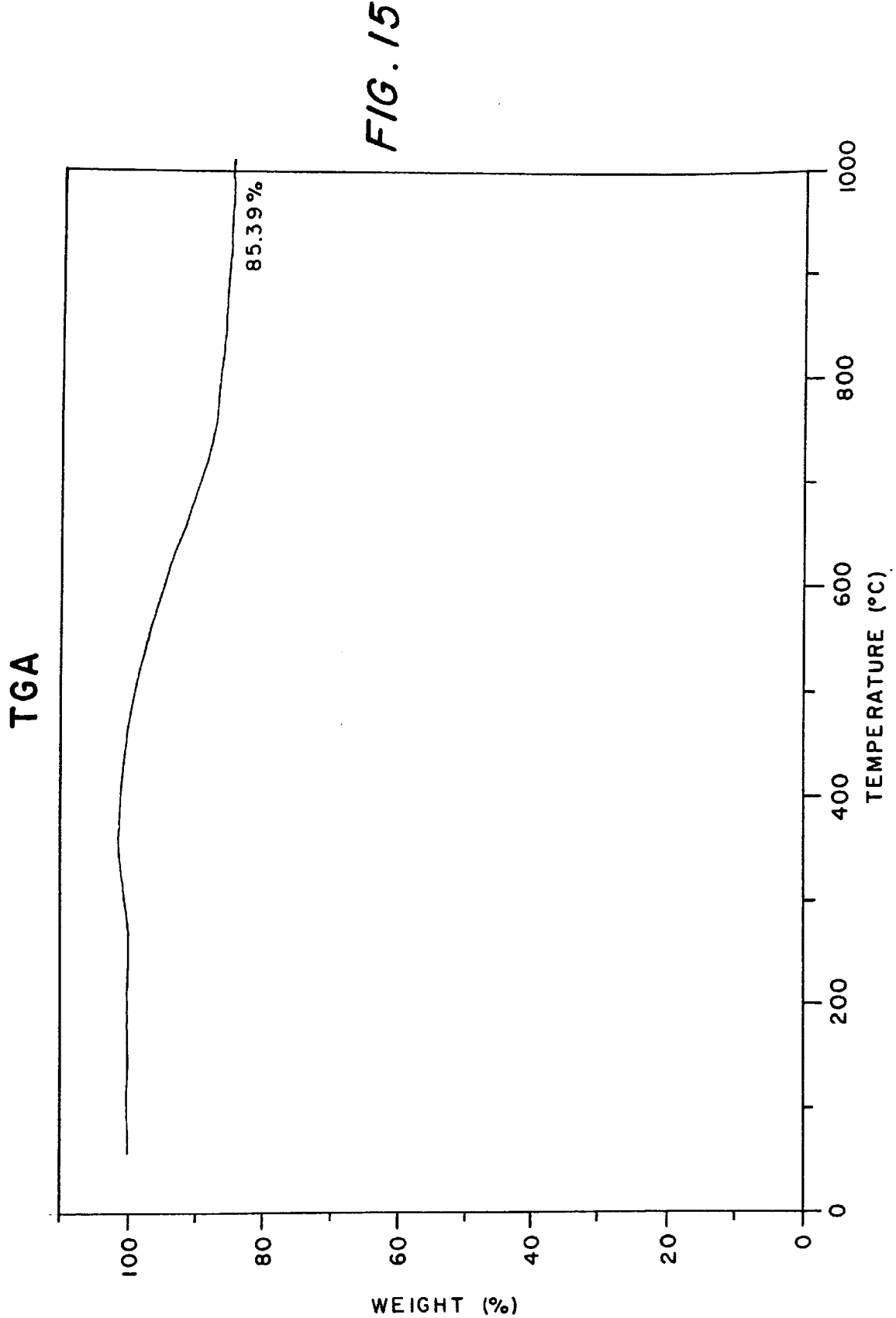
Figure 16:
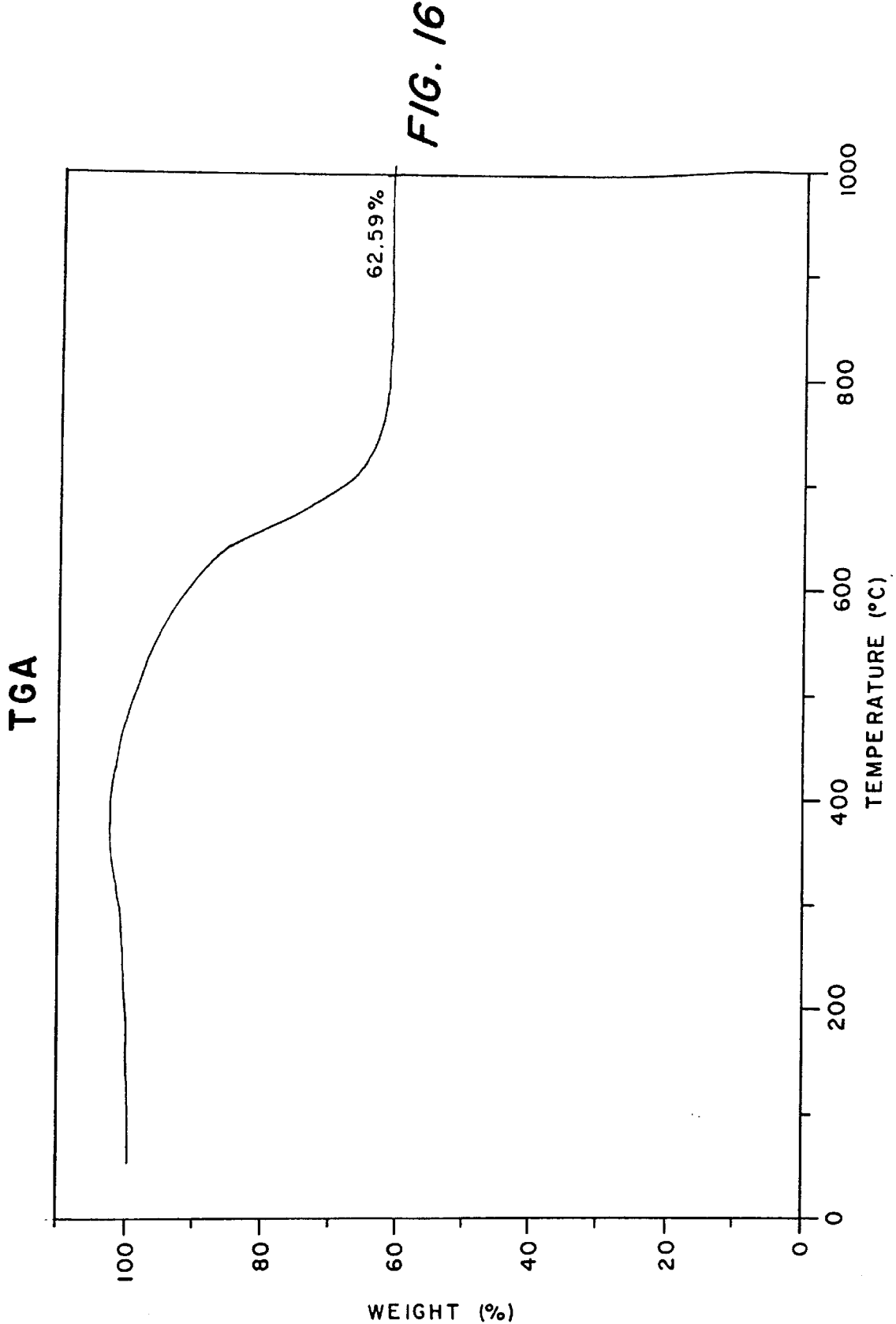

FIG. 13 is a TGA of the thermoset made from the linear polymer of FIGS. 1, 2, and 3. FIG. 14 is a TGA of the thermoset made from the linear polymer of FIGS. 4, 5, and 6. FIG. 15 is a TGA of the thermoset made from the linear polymer of FIGS. 7, 8, and 9. FIG. 16 is a TGA of the thermoset made from the linear polymer of FIGS. 10, 11, and 12. The thermosets of FIGS. 13, 14, 15 and 16 have the formula:

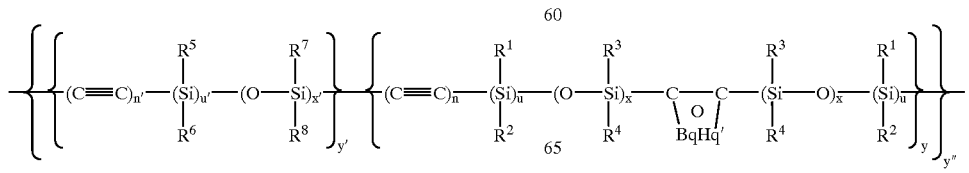

wherein the values of n, n', q, q' x, x', y, y' and y" are unchanged and the identities of $R^1=R^2=R^3=R^4=R^5=R^6=R^7=R^8=CH_3$ as previously indicated and y'/y is also unchanged, respectively.

DETAILED DESCRIPTION OF THE PREFERRED EMBODIMENTS

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

This invention relates to a new class of novel cross-linked thermosetting polymers (35) made by the following general reaction scheme:

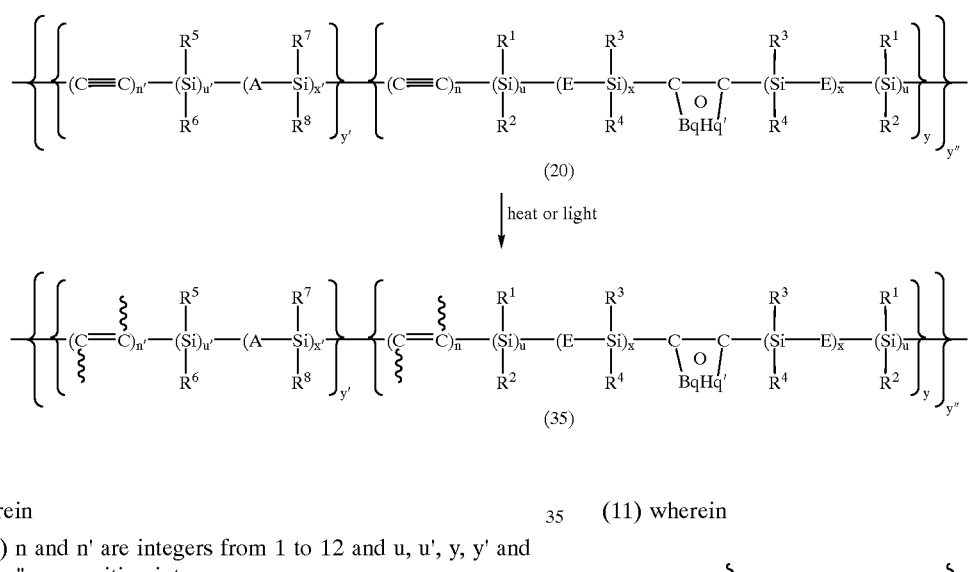

wherein (1) n and n' are integers from 1 to 12 and u, u', y, y' and y" are positive integers;

(2)

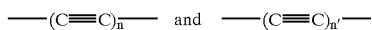

represent unconjugated acetylenic moieties or conjugated acetylenic moieties when n and n' are integers greater than 1, respectively;

(3) $R^1, R^2, R^3, R^4, R^5, R^6, R^7$ and $R^8$ are selected from the group consisting of saturated aliphatic, unsaturated aliphatic, aromatic, fluorocarbon moieties and mixtures thereof;

(4)

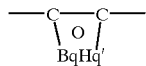

represents said carboranyl group;

(5) q and q' are integers from 3 to 16;

(6) x and x' represent integers greater than or equal to zero ($x \geq 0; x' \geq 0$);

(7) A is selected from the group consisting of O, an aliphatic bridge, an aryl bridge or mixtures thereof; and (8) E is selected from the group consisting of O, an aliphatic bridge, an aryl bridge or mixtures thereof;

(9) wherein E and A may be the same or different;

(10) wherein said carboranyl group represents a carboranyl group selected from the group consisting of 1,7-dodecacarboranyl; 1,10-octacarboranyl; 1,6octacarboranyl; 2,4-pentacarboranyl; 1,6tetracarboranyl; 9-alkyl-1,7-dodecacarboranyl; 9,10-dialkyl- 1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl; closo-dodecaortho-carboranyl; closo-dodeca-meta-carboranyl; closo-dodeca-vara-carboranyl and mixtures thereof; and

(11) wherein

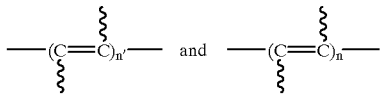

represent cross-linked alkenyl moieties and wherein n and n' are as previously indicated.

The conversion of the linear polymers (20) to the cross-linked polymers (35) is accomplished either by exposing the linear polymers (20) to heat or light. Thermal conversion of the carbon-to-carbon triple bonds in polymers (20) to form the thermosetting polymers (35) is dependent on both the curing temperature and the curing time. The heating of the linear polymers (20) is carried out over a curing temperature range sufficient for the cross-linking of the carbon-to-carbon triple bonds of the individual linear polymers (20) to occur resulting in the formation of a single mass of cross-linked polymers (35). The heating of the linear polymers (20) is carried out over a curing time sufficient for the cross linking of the carbon-to-carbon triple bonds of the individual linear polymers (20) to occur resulting in the formation of the cross-linked polymers (35). In general, the curing time is inversely related to the curing temperature. The typical temperature range, the preferred temperature range, the more preferred temperature range and the most preferred temperature range for the thermal conversion of linear polymers (20) to the cross-linked thermoset polymers (35) are, typically, 150–450° C., 200–400° C., 225–375° C. and 250–350° C., respectively. The typical curing time, the preferred curing time, the more preferred curing time, and the most preferred curing time for the thermal conversion of linear polymers (20) to the cross-linked thermoset polymers (35) are, typically, 1–48 hours, 2–24 hours, 8–12 hours and 1–8 hours, respectively.

The photocrosslinking process, of converting the carbon-to-carbon triple bonds of the linear polymers (20) into unsaturated cross-linked moieties necessary for forming the thermosetting polymers (35), is dependent on both the exposure time and the intensity of the light used during the photocrosslinking process. Ultraviolet (UV) light is the most preferred wavelength of light used during the photo-crosslinking process. The exposure time of the linear polymers (20) to the UV light is inversely related to the intensity of the UV light used. The exposure time to the UV or to other light used is that time which is sufficient for the carbon-to-carbon triple bonds of the linear polymers (20) to be cross linked to form the thermosetting polymers (35). The intensity of the light used is that intensity which is sufficient for the carbon-to-carbon triple bonds of the linear polymers (20) to be cross linked to form the thermosetting polymers (35). Furthermore, the wavelength of the light used is not limited to the UV range. The wavelength of light used is that wavelength which is sufficient for the carbon-to-carbon triple bonds of the linear polymers (20) to be cross linked to form the thermosetting polymers (35). The typical exposure time, the preferred exposure time, the more preferred exposure time and the most preferred exposure time are, typically, 1–100 hours, 24–36 hours, 12–24 hours and 4–8 hours, respectively. Examples of the conversion of linear polymers (20) to the cross-linked thermosets (35) are given infra.

The general chemical scheme for synthesizing these novel linear polymers (20) is represented by the exemplary synthesis of (20') given below:

wherein:
(1) $n=n'=2$, $u=u'=x=x'=1$, y, y' and y'' are positive integers;
(2)

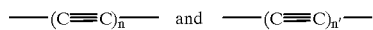

represents a conjugated acetylenic moiety where $n=n'=2$;
(3) $R^1=R^2=R^3=R^4=R^5=R^6=R^7=R^8=CH_3$;
(4)

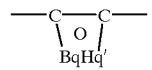

represents said carboranyl group; and
(5) $q=q'=10$;
(6) Z is selected from the group consisting of F, Cl, Br and I;
(7)

represents a dilithio salt where $n=2$ or $n'=2$;
(8) n-BuLi represents n-butyllithium;
(9) A is an oxygen atom; and
(10) E is an oxygen atom.

Given the general scheme, step 1 involves forming a salt, for example, the dilithio salt of butadiyne by reacting 4 equivalents of n-BuLi with hexachlorobutadiene. Note that Reagents of the following general formula may be used:

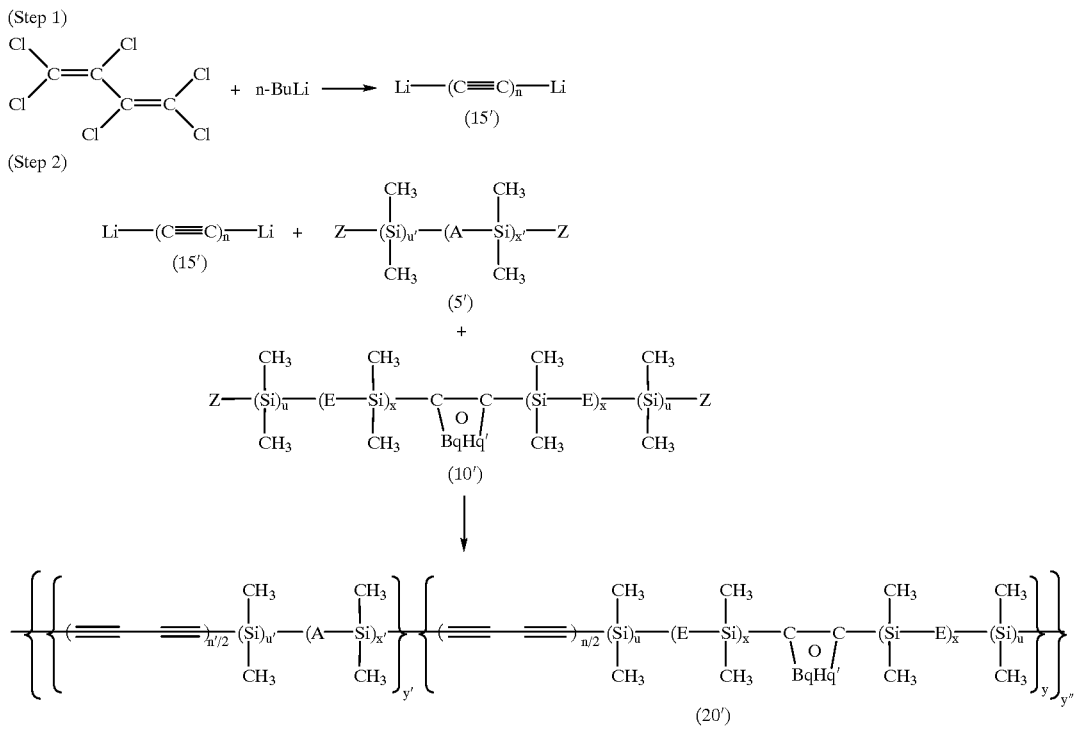

wherein M is selected from the group consisting of Li, Na, K and MgX' where X' is selected from the group consisting of F, Cl, Br and I. To form the polymer (20'), wherein y'/y=1.0, step 2 involves reacting the dilithiobutadiyne (15') produced in step 1 with compounds (5') and (10') wherein the molar concentration of (5') equals the molar concentration of (10') and wherein the molar concentrations of (5') and (10'), respectively, equal one-half (½) the molar concentration of the dilithiobutadiyne (15'). In general, the following concentrations are used:

(i) molar conc. of (5')+molar conc. of (10')=molar conc. of (15')

(ii) the ratio of y'/y=(molar conc. of (5'))/(molar conc. of (10')).

For the formation of polymer (20), the present invention makes the ratio of y'/y variable by the use of appropriate molar ratios of compounds having the formula (5) and (10), infra. In general, the ratio of y'/y is equal to the molar concentration of (5) used divided by the molar concentration of (10) used in forming (20). Thus, if equimolar amounts of (5) and (10), infra, are used, then the ratio of y'/y is about 1.0. If the molar ratios of (5) and (10), infra, used are 1 to 99, respectively, then the ratio of y'/y is about 0.01 in the formed product (20). Typically, the ratio y'/y is between about 0.01 to about 50. More typically, the ratio y'/y is between about 1 to about 25. Most typically, the ratio y'/y is between about 5 to about 15. Preferably, the ratio y'/y is between about 8 to about 12. Most preferably, the ratio y'/y is about 9.

It should be noted that if trichloroethylene is used in step 1 instead of hexachlorobutadiene, a salt of ethyne or acetylene is formed in step 1 where n=1. Consequently, an ethynyl moiety is incorporated into the polymer (20) produced in step 2 where n=n'=1. By using hexachlorobutadiene in step 1, the salt of butadiyne is formed where n=2. In turn, a butadiyne moiety is incorporated into polymer (20') where n=n'=2. In order to form a polymer where n=3, a salt of hexatriyne needs to be formed in step 1. The synthesis of the disodium salt of hexatriyne is given in the article by Bock and Seidl, *d-Orbital Effects in Silicon Substitutedπ-Electron Systems. Part XII. Some Spectroscopic Properties of Alkyl and Silyl Acetylenes and Polyacetylenes*, J. CHEM. SOC. (B), 1158 (1968) at pp. 1159, incorporated herein by reference in its entirety and for all purposes. Thus, by forming the appropriate alkynyl salt, the length of the alkynyl moiety, represented by the value of n and n', incorporated into the polymer formed in step 2 can be controlled. Typically, the value of n and n' can be varied from 1 to 12. Acetylenic derivatives having the general formula H(C≡C)$_n$H can be readily converted into the dilithio salts by reacting with n-butyllithium. The respective dilithio salts, with values of n varying from 1 to 12, can then be incorporated into the backbone of polymers (20) as shown in the aforementioned step 2. The value of n and n' can be varied, typically, from 1 to 12, more often from 1 to 10 and 1 to 8, most often from 1 to 6 and, in particular, from 1 to 3 and 1 to 2. Acetylenic derivatives having the general formula H(C≡C)$_n$H can be readily formed by the synthesis given by Eastmond et al. in *Silylation as a Protective Method for Terminal Alkynes in Oxidative Couplings—A General Synthesis of the Parent Polyynes*, 28 TETRAHEDRON 4601 (1972), incorporated herein by reference in its entirety and for all purposes.

Furthermore, a variety of compounds can be produced that have structures similar to that of compound (10') shown in step 1. One variation includes replacing the methyl groups attached to the Si with other hydrocarbon or aromatic moieties. Typical reactions synthesizing disubstituted dichloro silanes of varying size (varying values of u) and having different R groups are known in the art:

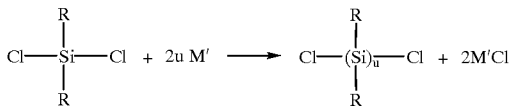

where M' is a group I metal or alloy. The above reaction is cited by ZELDIN ET AL. (EDITORS) in INORGANIC AND ORGANOMETALLIC POLYMERS, published by American Chemical Society, Washington, D.C. (1988) at 44 and 90. The value of u can be varied, typically, from 1 to 1000, more often from 1 to 500 and 1 to 250, most often from 1 to 100 and 1 to 10, and, in particular, from 1 to 6. Another variation includes controlling the values of x in addition to that of u.

Synthesis of a variation of compound (10') where u=1 and x=0 and E=O and Z=Cl is given by Papetti et al. in *A New Series of Oranoboranes. VI. The Synthesis and Reactions of Some Silyl Neocarboranes*, 3 INORG. CHEM. 1448 (1964) at 1449 under the caption "C,C'-Bis(methyldichlorosilyl) neocarborane (IV)", incorporated herein by reference in its entirety and for all purposes. The synthesis of compound (10') where u=1 and x=1 and E=O and Z=Cl is given by Papetti et al. in *A New Seres of Organoboranes. VII. The Preparation of Poly-m-carboranvlenesiloxanes*, 4 JOURNAL OF POLYMER SCIENCE: PART A-1, 1623 (1966) at 1630 under the caption "Compound (VII)", incorporated herein by reference in its entirety and for all purposes. Synthesis of a variation of compound (10') where u=1 and x=2 and E=O and Z=Cl is given by Scott et al. in *Icosahedral Carboranes. XV. Monomeric Carboranylenesiloxanes*, 9 INORG. CHEM. 2597 (1970) at 2599 under the caption "1,7-Bis(5-chlorohexamethyltrisiloxanyl)-m-carborane (IV)", incorporated herein by reference in its entirety and for all purposes.

While leaving u=1, the value of x can be varied, typically, from 0 to 1000, more often from 0 to 500 and 0 to 250, most often from 0 to 10, and, in particular, from 0 to 2 by the following proposed reaction scheme (i.e. the length of the polymer chain within compound (10) is varied according to the following reaction):

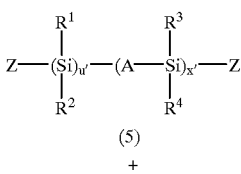

(5)

+

-continued

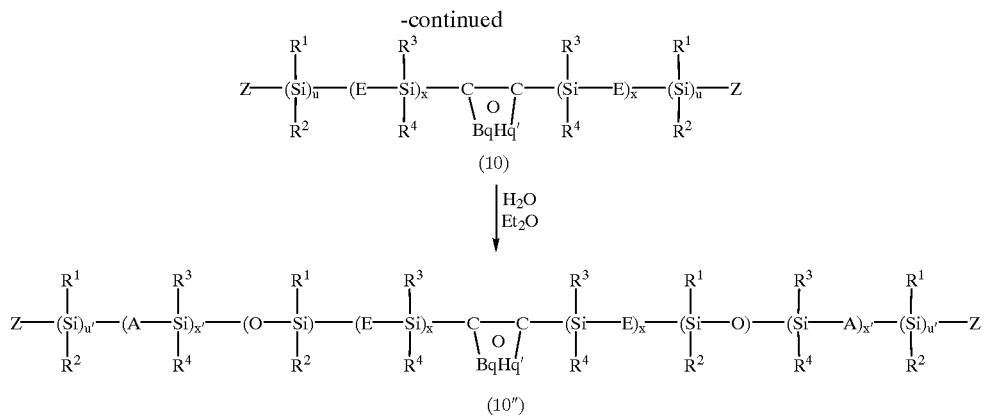

where x and x' are integers greater than or equal to 0 (x≧0; x'≧0), u' is a positive integer and A is an oxygen atom and E is an oxygen atom.

The value of x can be iteratively increased by reacting compounds (5) and (10) wherein u=u'=1 until the desired integral value of x is obtained; thereafter, further reacting the reaction product (10") with compound (5) wherein u' is an integer greater than 1 thereby forming product (10) wherein the value of u can be varied to integral values greater than 1 and wherein the value of x has been adjusted to a desired integral value greater than 1. Note that reaction product (10") is analogous to reactant (10) wherein the values of integrals u and x have been varied.

However, A may be selected from the group consisting of O, an aliphatic bridge, an aryl bridge or mixtures thereof. A may further be selected from the group consisting of an aliphatic bridge of about 1 to about 20 carbon atoms, an aryl bridge of about 5 to about 40 carbon atoms, or mixtures thereof. Furthermore, E may be selected from the group consisting of O, an aliphatic bridge, an aryl bridge or mixtures thereof. E may further be selected from the group consisting of an aliphatic bridge of about 1 to about 20 carbon atoms, an aryl bridge of about 5 to about 40 carbon atoms, or mixtures thereof. In addition, A and E may be the same or different. An exemplary synthesis of compound (10) is shown by the synthesis of exemplary compound (100). Synthesis of exemplary compound (100) wherein $R^1$, $R^2$, $R^3$ and $R^4$ are —$CH_3$, wherein E is —$CH_2CH_2CH_2CH_2$—, wherein x=2, u=1, and q=q'=10 is given in EXAMPLE 10, infra.

The synthesis of (5) is given below:

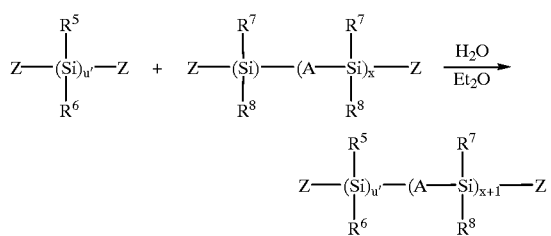

wherein x'=x+1 and A is an oxygen atom and wherein $R^5$, $R^6$, $R^7$, and $R^8$ may be the same or different.

For the case where A is not an oxygen atom, the synthesis of (5) is given below:

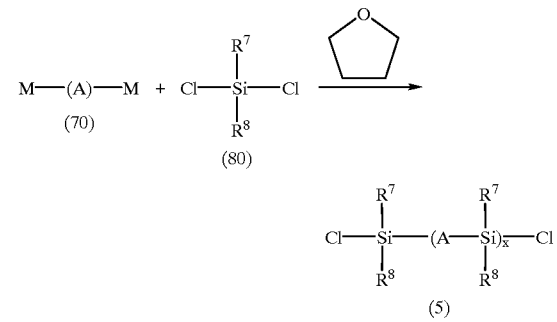

wherein M is selected from the group consisting of Li, Na, K and MgX' where X' is selected from the group consisting of F, Cl, Br and I, wherein $R^7$ and $R^8$ may be the same or different and x is a positive integer. Where the ratio of the molar concentration of (70) to the molar concentration of (80) is equal to about one-half, the value of x is about 1. Where the ratio of the molar concentration of (70) to the molar concentration of (80) is greater than one-half but less than 1, the value of x is greater than 1. When A is not an oxygen atom, to form compound (5), the value of x can be controlled by selecting the appropriate ratio of the molar concentration of (70) to the molar concentration of (80). If the ratio is selected according to ½≦(molar concentration of (70)/molar concentration of (80))<1, then the integral value of x obtained in compound (5) is proportional to the ratio of the molar concentration of (70) to the molar concentration of (80).

A may be selected from the group consisting of O, an aliphatic bridge, an aryl bridge or mixtures thereof. A may further be selected from the group consisting of an aliphatic bridge of about 1 to about 20 carbon atoms, an aryl bridge of about 5 to about 40 carbon atoms, or mixtures thereof.

Following the scheme in the aforementioned steps 1 and 2, the novel linear polymers (20) can be formed by reacting a salt of an alkyne or a respective Grignard reagent with compounds (5) and (10):

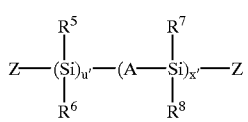

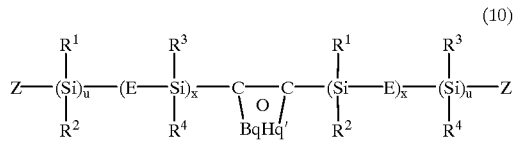

(10)

wherein E is selected from the group consisting of O, an aliphatic bridge, an aryl bridge or mixtures thereof and wherein A is selected from the group consisting of O, an aliphatic bridge, an aryl bridge or mixtures thereof.

These novel linear polymers (20) exhibit sufficiently low viscosities either at room temperature or at their respective melting points (i.e. 20–70° C.) to readily fill complex dies or shapes for forming parts therefrom. In addition, these polymers (20) can be further polymerized into thermosets and ceramics that form rigid shapes which are oxidatively stable at high temperatures above 600° C.

The following examples outline preferred embodiments of the present invention.

EXAMPLE 1

Compound (30) is synthesized according to the method of Papetti & Heying. See S. Papetti et al. 3 INORG CHEM 1448 (1964). The structure of compound (30) is given below:

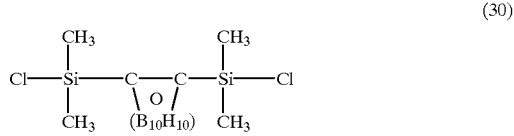

(30)

According to the method of Papetti et al., a 100 ml round bottom 3-neck flask was fitted with an addition funnel and septa, flushed with argon, and flamed. The reaction was carried out under an inert atmosphere (argon). Butyllithium (18.0 ml 2.5 M in hexanes, 44.9 mmol) was cooled to −78° C. Meta-carborane (2.5902 g, 18.0 mmol) in 10 ml THF was added dropwise. A white solid (dilithiocarborane) formed and the reaction was allowed to warm to ambient temperature. After cooling the reaction mixture back to −78° C., dichlorodimethylsilane (5.5 ml, 43.5 mmol) was added dropwise.

EXAMPLE 2

EXPERIMENTAL SECTION
General Comments Apply to Examples 2–8:

All reactions were carried out in an inert atmosphere unless otherwise noted. Solvents were purified by established procedures. 1,7-Bis(chlorotetramethyldisiloxy)-m-carborane (40) was obtained from Dexsil and used as received. 1,7-Bis(chlorotetramethyldisiloxy)-m-carborane (40) has the following structure:

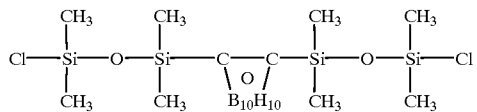

(40)

1,3-Dichlorotetramethyldisiloxane (50) was obtained from Silar Laboratories or United Chemical Technologies and used as received. 1,3-Dichlorotetramethyldisiloxane (50) has the following structure:

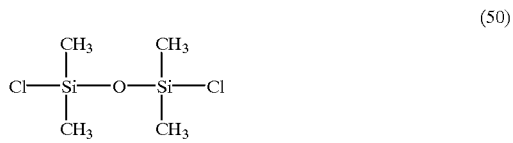

(50)

n-Butyllithium (2.5 M in hexane), and hexachlorobutadiene were obtained from Aldrich and used as received. Thermogravimetric analyses (TGA) were performed on a DuPont 951 thermogravimetric analyzer. Differential scanning calorimetry analyses (DSC) were performed on a DuPont 910 instrument. Unless otherwise noted, all thermal experiments were carried out with a heating rate of 10° C./min and a nitrogen flow rate of 50 mL/min.

EXAMPLE 3

Preparation of 1,4-dilithio-1,3-butadiyne:

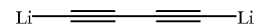

A 50 mL three-necked round-bottomed flask was equipped with a stir bar, glass stopper, septum, and gas inlet tube. After the flask was flame-dried, THF (5 mL) was injected and the flask was placed in a dry ice/acetone bath. n-BuLi (10.6 mL of a 2.5M solution, 26.5 mmol) was then added and the mixture was stirred for 5 min. Subsequently, hexachlorobutadiene (0.99 mL, 6.3 mmol) was added dropwise via syringe. After completion of addition, the cold bath was removed and the mixture was stirred at room temperature for two hours. The resulting dark brown mixture was used without further treatment.

EXAMPLE 4

Preparation of polymer (20') from 50/50 of (40)/(50), respectively (y'/y≈1.0):

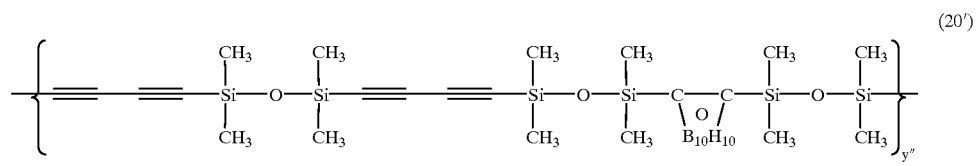

(20')

A mixture of 1,4-dilithio-1,3-butadiyne (6.3 mmol) in THF/hexane was cooled in a dry ice/acetone bath. To this mixture a homogeneous solution of (40) (1.43 mL, 3.15 mmol) and (50) (0.62 mL, 3.15 mmol) was added dropwise over a period of 15 min. After addition, the cold bath was removed and the mixture was stirred at room temperature for two hours. The tan mixture was then poured into an ice-cooled solution of saturated aqueous ammonium chloride (30 mL) with stirring. The resulting two-phased mixture was filtered through a Celite pad and the layers were separated. The aqueous layer was extracted twice with diethyl ether and the combined organic layers were washed twice with distilled water and once with saturated aqueous sodium chloride solution. The organic layer was dried over anhydrous magnesium sulfate and filtered. Most of the volatiles were removed under reduced pressure at room temperature and the residue was heated at 75° C. for three hours at 0.1 mm Hg pressure to leave a viscous dark brown material (1.76 g). $^1$H NMR spectroscopy shows large peaks at δ (ppm) 0.2–0.4 corresponding to the —SiCH$_3$ protons, and a broad resonance from a (ppm) 1.2–2.8 corresponding to the carborane protons in the polymer. $^{13}$C NMR spectroscopy shows two peaks at δ (ppm) 0.30 and δ (ppm) 1.9 corresponding to the —SiCH$_3$ carbons, a peak at δ (ppm) 68.1 corresponding to the carborane carbons, and two peaks at δ (ppm) 84.8 and δ (ppm) 87.0 corresponding to the two acetylenic carbons in the polymer. Infrared spectroscopic (IR) analysis confirms the presence of the acetylenic groups with a strong peak at 2071 cm$^{-1}$. Other prominent peaks are present at (cm$^{-1}$): 2962 (C-H), 2596 (B-H), and 1077 (Si—O). DSC analysis showed the principal exotherm at 321° C. (FIG. 1). Char yield (TGA)=82% (FIG. 2). Reheating the char to 1000° C. in air resulted in only ~0.3% weight loss (FIG. 3). Holding the sample at 1000° C. in air for one hour resulted in an additional ~0.3% weight loss. The weight loss leveled off after approximately 40 minutes.

EXAMPLE 5

Preparation of Polymer (20) from 25/75 of (40)/(50), Respectively (y'/y≈3.0):

In the same manner outlined above, 1,4-dilithio-1,3-butadiyne (6.3 mmol) was reacted with a homogeneous mixture of (40) (0.71 mL, 1.58 mmol) and (20) (0.92 mL, 4.72 mmol). The usual workup gave a viscous dark brown material (1.3 g) which slowly solidified into a sticky solid. DSC analysis showed the principal exotherm at 299° C. (FIG. 4). Char yield (TGA)=76% (FIG. 5). Reheating the char to 1000° C. in air showed minimal weight loss (FIG. 6). Holding the sample at 1000° C. in air for one hour resulted in ~0.3% weight loss.

EXAMPLE 6

Preparation of Polymer (20) from 10/90 of (40)/(50), Respectively (y'/y≈9.0):

In the usual manner, 1,4-dilithio-1,3-butadiyne (6.3 mmol) was reacted with a homogeneous mixture of (40) (0.29 ml, 0.63 mmol) and (50) (1.1 mL, 5.67 mmol). The usual workup gave a very viscous dark brown material (1.22 g) which slowly solidified into a sticky solid. DSC analysis showed the principal exotherm at 289° C. (FIG. 7). Char yield (TGA)=73% (FIG. 8). Reheating the char to 1000° C. in air resulted in 1% weight loss (FIG. 9). Holding the sample at 1000° C. in air for one hour resulted in no additional weight loss.

EXAMPLE 7

Preparation of Polymer (20') from 50/50 of (40)/(50), Respectively (y'/y≈1.0) using the Stepwise Method:

A mixture of 1,4dilithio-1,3-butadiyne (6.3 mmol) in THF/hexane was cooled in a dry ice/acetone bath. To this mixture compound (40) (1.43 mL, 3.15 mmol) was added dropwise. After addition and without delay, compound (50) (0.62 mL, 3.15 mmol) was added dropwise. The addition of both components lasted approximately 15 min. Usual workup gave a material whose properties were virtually identical to those of the material described in the 50/50 homogeneous approach. Reversing the order of addition (i.e. adding (50) followed by (40) also gave similar material (20') wherein y'/y 1.0.

EXAMPLE 8

Preparation of Polymer (20) from 5/95 of (40)/(50), Respectively (y'/y≈19.0) using the Stepwise Method:

In the usual manner, compounds (40) (0.14 mL, 0.31 mmol) and (50) (1.17 mL, 5.98 mmol) were added sequentially to a mixture of 1,4-dilithio-1,3-butadiyne (6.3 mmol) in THF/hexane cooled in a dry ice/acetone bath. The usual workup gave a viscous, dark brown material (1.2 g) which slowly solidified into a sticky solid. DSC analysis showed the principal exotherm at 290° C. (FIG. 10). Char yield (TGA)=66% (FIG. 11). Reheating the char to 1000° C. in air resulted in 16% weight loss (FIG. 12). Holding the sample at 700° C. in air for one hour resulted in an additional 13% weight loss after two hours.

EXAMPLE 9

Preparation of Polymer (20) Where A=Phenyl and E=Oxygen and y'/y=1

Cool a mixture of 1,4-dilithio-1,3-butadiyne in THF/hexane using a dry ice/acetone bath. To this mixture add a homogeneous solution of 1,4-bis-dimethylchlorosilylbenzene and 40 (equal molar amounts) dropwise over a period of 15 min. After addition, remove the cold bath and stir the reaction mixture at room temperature for two hours. Pour the reaction mixture into an ice-cooled solution of saturated aqueous ammonium chloride with stirring. Filter the suspension through a Celite pad and separate the layers. Extract the aqueous layer twice with diethyl ether and wash the combined organic layers twice with distilled water and once with saturated aqueous sodium chloride solution. Dry the organic layer over anhydrous magnesium sulfate and filter. Remove volatiles by heating (no higher than 75° C.) under reduced pressure to leave the polymer. Note that in the final polymer of this example, x=x'=1, n=n'=2, u=1, q=q'=10, and $R^1, R^2, R^3, R^4, R^5, R^6, R^7$ and $R^8$ are —CH$_3$. Additional details for preparation of 1,4-bis-dimethylchlorosilylbenzene are given by Sveda et al., in U.S. Pat. Nos. 2,561,429 (1951) and 2,562,000 (1951), each patent incorporated herein by reference in its entirety and for all purposes. Additional details are given in U.S. Pat. Nos. 5,272,237; 5,292,779 and 5,348,917, each patent incorporated herein by reference in its entirety and for all purposes.

EXAMPLE 10

Preparation of the Polymer (100) having the Formula Given Below (ClSi(CH)CH$_3$)$_2$CH$_2$CH$_2$CH$_2$CH$_2$Si(CH$_3$)$_2$ CH$_2$CH$_2$CH$_2$CH$_2$Si(CH$_3$)$_2$)$_2$CB$_{10}$H$_{10}$C (100)

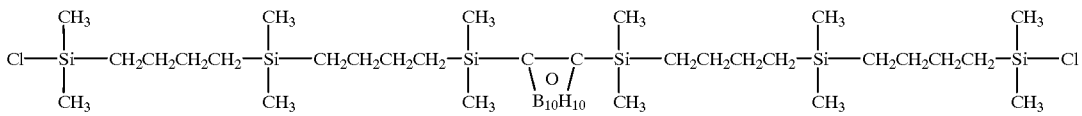

Prepare a THF Solution of BrMgCH$_2$CH$_2$CH$_2$CH$_2$MgBr (200) from 1,4-dibromobutane and two equivalents of magnesium. Add two equivalents of dimetbylchlorosilane to form HSi(CH$_3$)$_2$CH$_2$CH$_2$CH$_2$CH$_2$Si(CH$_3$)$_2$H. Treat this compound with catalytic amounts of benzoyl peroxide in refluxing carbon tetrachloride to form ClSi(CH$_3$)$_2$CH$_2$CH$_2$CH$_2$CH$_2$Si(CH$_3$)$_2$Cl (300). Treat a solution of (200) with one equivalent of (300) and one-half equivalent of ClSi(CH$_3$)$_2$CB$_{10}$H$_{10}$CSi(CH$_3$)$_2$Cl to form the target material (100).

Alternatively, exemplary compound (300) may be formed according to the reaction:

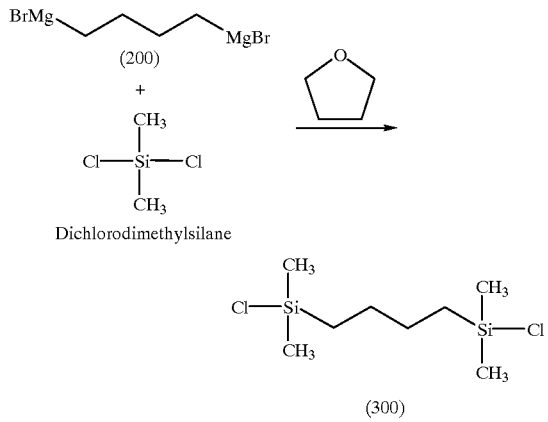

EXAMPLE 11
Preparation of Polymer (20) Where E=A=—(CH$_2$CH$_2$CH$_2$CH$_2$)— and y'/y=1

Cool a mixture of 1,4-dilithio-1,3-butadiyne in TRF/hexane using a dry ice/acetone bath. To this mixture add a homogeneous solution of 300 and 100 (equal molar amounts) dropwise over a period of 15 min. After addition, remove the cold bath and stir the reaction mixture at room temperature for two hours. Pour the reaction mixture into an ice-cooled solution of saturated aqueous ammonium chloride with stirring. Filter the suspension through a Celite pad and separate the layers. Extract the aqueous layer twice with diethyl ether and wash the combined organic layers twice with distilled water and once with saturated aqueous sodium chloride solution. Dry the organic layer over anhydrous magnesium sulfate and filter. Remove volatiles by heating (no higher than 75° C.) under reduced pressure to leave the polymer. Note that in the final polymer of this example, x=2, x'=1, n=n'=2, u=1, q=q'=10, and R$^1$, R$^2$, R$^3$, R$^4$, R$^5$, R$^6$, R$^7$ and R$^8$ are —CH$_3$.

EXAMPLE 12
Preparation of Thermoset (35) having the Formula wherein y'/y=1.0:

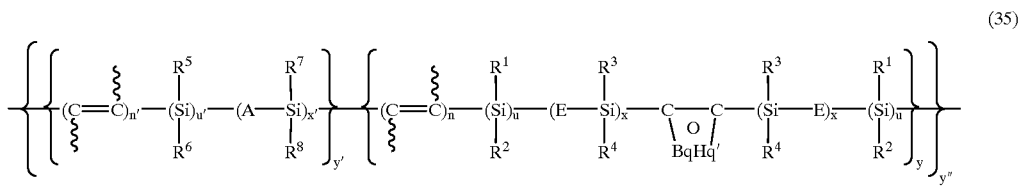

(35)

wherein n=n'=2, u=u'=1, x=x'=1, q=q'=10, A=E=an oxygen atom, and R$^1$, R$^2$, R$^3$, R$^4$, R$^5$, R$^6$, R$^7$ and R$^8$ are —CH$_3$. To obtain the thermoset (35) wherein the ratio y'/y is varied as desired, the corresponding linear polymer of the structure (20) is used as the starting material subjected to either heat or light.

To form the compound of EXAMPLE 12, the linear polymer (20) wherein n=n'=2, u=u'=1, x=x'=1, q=q'=10, A=E=an oxygen atom, y'/y=1.0 and R$^1$, R$^2$, R$^3$, R$^4$, R$^5$, R$^6$, R$^7$ and R$^8$ are —CH$_3$ was heated in nitrogen at 300° C. for 2 hours then at 350° C. for 2 hours and finally at 400° C., for 2 hours. Between each isotherm, the linear polymer (20) was subjected to a temperature heating gradient of 5° C./minute. The thermoset (35) of EXAMPLE 12 was formed in this manner. Approximately, 15 mg of linear polymer (20) was converted to the thermoset (35) by the isothermic heating described above wherein about 13.50 mg of thermoset (35) was formed. The TGA of the thermoset of this example in air is shown in FIG. 13.

EXAMPLE 13
Preparation of Thermoset (35), supra having the Formula wherein y'/y=3.0:

wherein n=n'=2, u=u'=1, x=x'=1, q=q'=10, A=E=an oxygen atom, and R$^1$, R$^2$, R$^3$, R$^4$, R$^5$, R$^6$, R$^7$ and R$^8$ are —CH$_3$. To obtain the thermoset (35) wherein the ratio y'/y is varied as desired, the corresponding linear polymer of the structure (20) is used as the starting material subjected to either heat or light.

To form the compound of EXAMPLE 13, the linear polymer (20) wherein n=n'=2, u=u'=1, x=x'=1, q=q'=10, A=E=an oxygen atom, y'/y=3.0 and R$^1$, R$^2$, R$^3$, R$^4$, R$^5$, R$^6$, R$^7$ and R$^8$ are —CH$_3$ was heated in nitrogen at 300° C. for 2 hours then at 350° C. for 2 hours and finally at 400° C., for 2 hours. Between each isotherm, the linear polymer (20) was subjected to a temperature heating gradient of 5° C./minute. The thermoset (35) of EXAMPLE 13 was formed in this manner. Approximately, 15 mg of linear polymer (20) was converted to the thermoset (35) by the isothermic heating described above wherein about 13.50 mg of thermoset (35)

was formed. The TGA of the thermoset of this example in air is shown in FIG. 14.

EXAMPLE 14

Preparation of Thermoset (35), supra, having the Formula wherein y'/y=9.0:
wherein n=n'=2, u=u'=1, x=x'=1, q=q'=10, A=E=an oxygen atom, and $R^1$, $R^2$, $R^3$, $R^4$, $R^5$, $R^6$, $R^7$ and $R^8$ are —$CH_3$. To obtain the thermoset (35) wherein the ratio y'/y is varied as desired, the corresponding linear polymer of the structure (20) is used as the starting material subjected to either heat or light.

To form the compound of EXAMPLE 14, the linear polymer (20) wherein n=n'=2, u=u'=1, x=x'=1, q=q'=10, A=E=an oxygen atom, y'/y=9.0 and $R^1$, $R^2$, $R^3$, $R^4$, $R^5$, $R^6$, $R^7$ and $R^8$ are —$CH_3$ was heated in nitrogen at 300° C. for 2 hours then at 350° C. for 2 hours and finally at 400° C., for 2 hours. Between each isotherm, the linear polymer (20) was subjected to a temperature heating gradient of 5° C./minute. The thermoset (35) of EXAMPLE 14 was formed in this manner. Approximately, 15 mg of linear polymer (20) was converted to the thermoset (35) by the isothermic heating described above wherein about 12.75 mg of thermoset (35) was formed. The TGA of the thermoset of this example in air is shown in FIG. 15.

EXAMPLE 15

Preparation of Thermoset (35), supra, having the Formula wherein y'/y=19.0:
wherein n=n'=2, u=u'=1, x=x'=1, q=q'=10, A=E=an oxygen atom, and $R^1$, $R^2$, $R^3$, $R^4$, $R^5$, $R^6$, $R^7$ and $R^8$ are —$CH_3$. To obtain the thermoset (35) wherein the ratio y'/y is varied as desired, the corresponding linear polymer of the structure (20) is used as the starting material subjected to either heat or light.

To form the compound of EXAMPLE 15, the linear polymer (20) wherein n=n'=2, u=u'=1, x=x'=1, q=q'=10, A=E=an oxygen atom, y'y=19.0 and $R^1$, $R^2$, $R^3$, $R^4$, $R^5$, $R^6$, $R^7$ and $R^8$ are —$CH_3$ was heated in nitrogen at 300° C. for 2 hours then at 350° C. for 2 hours and finally at 400° C., for 2 hours. Between each isotherm, the linear polymer (20) was subjected to a temperature heating gradient of 5° C./minute. The thermoset (35) of EXAMPLE 15 was formed in this manner. Approximately, 15 mg of linear polymer (20) was converted to the thermoset (35) by the isothermic heating described above wherein about 12 mg of thermoset (35) was formed. The TGA of the thermoset of this example in air is shown in FIG. 16.

EXAMPLE 16

Formation of Ceramics from the Thermosets having the General Formula (35), supra:

Ceramics of thermosets having the general formula (35) are readily made by heating the thermosets to about 1000° C. at a rate of about 10° C./minute either in a nitrogen or oxidizing atmosphere (e.g. air). The ceramics of each of the thermosets of EXAMPLES 12, 13, 14 and 15 were made during the heating process entailed in obtaining the TGA plots shown in FIGS. 13, 14, 15 and 16, respectively.

Patent application entitled LINEAR CARBORANE-(SILOXANE or SILANE) ACETYLENE BASED COPOLYMERS with named inventors Teddy M. Keller and David Y. Son having the docket Navy Case No. 76,339 filed on Nov. 7, 1994 is incorporated herein by reference in its entirety and for all purposes.

EXAMPLE 17

Formation of Ceramics from Linear Polymer (20) wherein y'/=9.0:

wherein n=n'=2, u=u'=1, x=x'=1, q=q'=10, A=E=an oxygen atom, and $R^1$, $R^2$, $R^3$, $R^4$, $R^5$, $R^6$, $R^7$ and $R^8$ are —$CH_3$. Four circular pans were coated with a fluorinated mold release agent and loaded with polymer (20) wherein n=n'=2, u=u'=1, x=x'=1, q=q'=10, A=E=an oxygen atom, and $R^1$, $R^2$, $R^3$, $R^4$, $R^5$, $R^6$, $R^7$ and $R^8$ are —$CH_3$. The samples were degassed at 110° C. in a vacuum oven. Total mass of samples was equal to about 6.28 g. The samples were then placed in a furnace under argon and cured to a maximum temperature of 300° C. as in previous examples. Four hard thermosets were obtained (6.07 g total). The thermosets were sanded down. Total mass of the thermosets was about 5.15 g. The thermoset samples so formed were placed in the furnace again and heated to 1000° C. at a rate of 1°/min and held at 1000° C. for one hour before cooling to room temperature. Hard, black ceramic chars were obtained with a total mass of about 3.84 g. Two of these chars were heated to 600° C. in air and held at that temperature for 100 hours. After this heating period, the char samples so formed exhibited no weight loss and appeared visibly the same as prior the heat treatment.

What is claimed is:

1. A boron-carbon-silicon ceramic made by a method comprising the step of: pyrolyzing at a temperature and for a time an organoboron thermoset polymer having a repeating unit of formula (I):

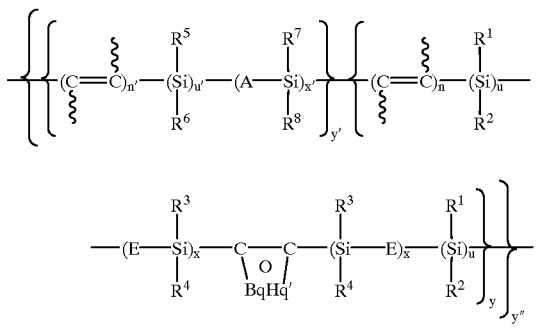

wherein:

(1) n and n' are integers from 1 to 12 and u, u', y, y' and y" are positive integers;

(2) wherein

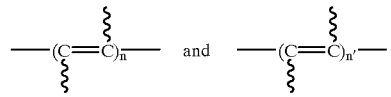

represent cross-linked alkenyl moieties and wherein n and n' are as previously indicated;

(3) $R^1$, $R^2$, $R^3$, $R^4$, $R^5$, $R^6$, $R^7$ and $R^8$ are selected from the group consisting of saturated aliphatic, unsaturated aliphatic, aromatic, fluorocarbon moieties and mixtures thereof;

(4)

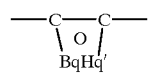

represents a carboranyl group;

(5) q and q' are integers from 3 to 16;

(6) x and x' represent integers between 0 to 2000;

(7) A is selected from the group consisting of O, an aliphatic bridge, an aryl bridge and mixtures thereof;

(8) E is selected from the group consisting of O, an aliphatic bridge, an aryl bridge and mixtures thereof; and (9) wherein E and A may be the same or different.

2. The ceramic of claim 1 wherein said carboranyl group represents a carboranyl group selected from the group consisting of 1,7-dodecacarboranyl; 1,10-octacarboranyl; 1,6-octacarboranyl; 2,4-pentacarboranyl; 1,6-tetracarboranyl; 9-alkyl-1,7-dodecacarboranyl; 9,10-dialkyl-1,7-dodecacarboranyl; 2-alkyl-1,10-octacarboranyl; 8-alkyl-1,6-octacarboranyl; decachloro-1,7-dodecacarboranyl; octachloro-1,10-octacarboranyl; decafluoro-1,7-dodecacarboranyl; octafluoro-1,10-octacarboranyl and mixtures thereof.

3. The ceramic of claim 1 wherein said carboranyl group represents a closo-dodecacarboranyl group selected from the group consisting of closo-dodeca-ortho-carboranyl, closo-dodeca-meta-carboranyl, closo-dodeca-para-carboranyl and mixtures thereof.

4. The ceramic of claim 1 wherein said $R^1$, said $R^2$, said $R^3$, said $R^4$, said $R^5$, said $R^6$, said $R^7$, and said $R^8$ may be the same or different and wherein each said $R^1$, said $R^2$, said $R^3$, said $R^4$, said $R^5$, said $R^6$, said $R^7$, and said $R^8$ represents a hydrocarbon group having up to 20 carbon atoms and being selected from the group consisting of alkyl, aryl, alkylaryl, haloalkyl, haloaryl and mixtures thereof.

5. The ceramic of claim 1 wherein said u, said u' and said y" are integers from 1 to 1000 and said x and said x' are integers from 0 to 1000 and said n and said n' are integers from 1 to 12 and having a ratio of y'/y being greater than zero.

6. The ceramic of claim 1 wherein said u, said u' and said y" are integers from 1 to 500 and said x and said x' are integers from 0 to 500 and said n and said n' are integers from 1 to 10 and having a ratio of y'/y being between about 0.0001 to about 100.

7. The ceramic of claim 1 wherein said u, said u' and said y" are integers from 1 to 250 and said x and said x' are integers from 0 to 250 and said n and said n' are integers from 1 to 8 and having a ratio of y'/y being between about 0.01 to about 50.

8. The ceramic of claim 1 wherein said u, said u' and said y" are integers from 1 to 100 and said x and said x' are integers from 0 to 100 and said n and said n' are integers from 1 to 6 and having a ratio of y'/y being between about 1 to about 25.

9. The ceramic of claim 1 wherein said u and said u' are integers from 1 to 10 and said x and said x' are integers from 0 to 10 and said n and said n' are integers from 1 to 3 and having a ratio of y'/y being between about 5 to about 15.

10. The ceramic of claim 1 wherein said u and said u' are integers from 1 to 6 and said x and said x' are integers from 0 to 2 and having a ratio of y'/y being between about 8 to about 12.

11. The ceramic of claim 1 wherein said u, said u', said x, said x' are integers equal to 1 and said n and said n' are integers equal to 2 and having a ratio of y'/y being about 9.

12. The boron-carbon-silicon ceramic of claim 1 wherein said temperature of said pyrolyzing step is from 300–2000° C. and said time is from 1–8 hours.

13. The boron-carbon-silicon ceramic of claim 1 wherein said temperature of said pyrolyzing step is from 350–1500° C. and said time is from 1–8 hours.

14. The boron-carbon-silicon ceramic of claim 1 wherein said temperature of said pyrolyzing step is from 400–1250° C. and said time is from 4–12 hours.

15. The boron-carbon-silicon ceramic of claim 1 wherein said temperature of said pyrolyzing step is from 450–1000° C. and said time is from 2–24 hours.

16. The boron-carbon-silicon ceramic of claim 1 wherein said temperature of said pyrolyzing step is from 500–1000° C. and said time is from 1–48 hours.

17. The boron-carbon-silicon ceramic of claim 1 wherein said temperature of said pyrolyzing step is from 600–1000° C. and said time is from 1–48 hours.

18. The boron-carbon-silicon ceramic of claim 1 wherein said temperature of said pyrolyzing step is from 700–1000° C. and said time is from 1–48 hours.

19. The boron-carbon-silicon ceramic of claim 1 wherein said temperature of said pyrolyzing step is from 800–1000° C. and said time is from 1–48 hours.

20. The boron-carbon-silicon ceramic of claim 1 wherein said temperature of said pyrolyzing step is from 900–1000° C. and said time is from 1–48 hours.

\* \* \* \* \*